US012576954B2

(12) United States Patent
Uggeri et al.

(10) Patent No.: US 12,576,954 B2
(45) Date of Patent: *Mar. 17, 2026

(54) SYSTEM AND METHOD FOR IDENTIFYING WHEN A WATER-SPORTS PARTICIPANT HAS FALLEN

(71) Applicant: MasterCraft Boat Company, LLC, Vonore, TN (US)

(72) Inventors: Michael J. Uggeri, Knoxville, TN (US); David F. Ekern, Knoxville, TN (US); Chad A. Lynema, Knoxville, TN (US); Zach C. Gordon, Vonore, TN (US); Colin J. Schweigert, Whitehall, MI (US); Abhijeet Vaidya, Columbus, IN (US)

(73) Assignee: MasterCraft Boat Company, LLC, Vonore, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,765

(22) Filed: Jun. 17, 2024

(65) Prior Publication Data

US 2024/0336338 A1 Oct. 10, 2024

Related U.S. Application Data

(63) Continuation of application No. 17/855,963, filed on Jul. 1, 2022, now Pat. No. 12,024,269.

(Continued)

(51) Int. Cl.
*B63C 9/00* (2006.01)
*B63B 34/60* (2020.01)
(Continued)

(52) U.S. Cl.
CPC ............ *B63C 9/0005* (2013.01); *B63B 34/60* (2020.02); *B63B 34/70* (2020.02); *G06V 40/103* (2022.01); *G08B 21/08* (2013.01)

(58) Field of Classification Search
CPC ....... B63C 9/0005; B63B 34/60; B63B 34/70; G06V 40/103; G08B 21/08
See application file for complete search history.

(56) References Cited

U.S. PATENT DOCUMENTS

| | | | |
|---|---|---|---|
| 5,027,432 A | 6/1991 | Skala et al. | |
| 5,034,984 A | 7/1991 | Bose | |

(Continued)

FOREIGN PATENT DOCUMENTS

| | | |
|---|---|---|
| EP | 2744106 B1 | 8/2020 |
| EP | 3699714 A2 | 8/2020 |

OTHER PUBLICATIONS

Installation and Use of Your Wakeblaster: WakeBlaster; http://www.wakeblaster.com/installation/installation (accessed Jun. 10, 2021).

(Continued)

*Primary Examiner* — John A Tweel, Jr.
(74) *Attorney, Agent, or Firm* — Venable LLP

(57) ABSTRACT

A boat, boat systems, and methods to determine when a water-sports participant has fallen. The boat may include an image sensor and an image processor communicatively coupled to the image sensor. The image sensor is configured to capture at least one image of the environment aft of the stern of the boat. The image processor is configured to execute a rider-down analysis that includes analyzing, using an object recognition process executed by the image processor, an image to be analyzed to determine if a water-sports participant has fallen. The boat may include a controller configured to execute a rider-down action when the water-sports participant has fallen. The controller may execute the rider-down action when the image processor determines that the water-sports participant has fallen based upon the rider-down analysis.

20 Claims, 19 Drawing Sheets

Related U.S. Application Data

(60) Provisional application No. 63/218,254, filed on Jul. 2, 2021.

(51) Int. Cl.
B63B 34/70 (2020.01)
G06V 40/10 (2022.01)
G08B 21/08 (2006.01)

(56) References Cited

U.S. PATENT DOCUMENTS

| | | | |
|---|---|---|---|
| 5,190,256 A | 3/1993 | Macchiarella | |
| 5,408,221 A | 4/1995 | Carsella, Sr. et al. | |
| 6,539,886 B2 | 4/2003 | Henry et al. | |
| 7,109,871 B2 | 9/2006 | Lentine et al. | |
| 7,361,067 B1 | 4/2008 | Smedema | |
| 7,394,906 B2 | 7/2008 | Jun | |
| 7,513,807 B2 | 4/2009 | Kinoshita et al. | |
| 7,715,574 B2 | 5/2010 | Aikins | |
| 8,063,815 B2 | 11/2011 | Valo et al. | |
| 8,384,780 B1 | 2/2013 | Frank et al. | |
| 8,465,333 B2 | 6/2013 | Sells | |
| 8,659,661 B2 | 2/2014 | Frank et al. | |
| 8,798,825 B1 | 8/2014 | Hartman | |
| 8,833,286 B1 | 9/2014 | Sheedy et al. | |
| 9,031,285 B2 | 5/2015 | Nguyen et al. | |
| 9,197,180 B2 | 11/2015 | Kamio | |
| 9,254,896 B2 | 2/2016 | Bertalan et al. | |
| 9,355,463 B1 | 5/2016 | Arambel et al. | |
| 9,580,155 B2 | 2/2017 | Lake et al. | |
| 9,611,009 B1 | 4/2017 | Myers et al. | |
| 9,650,117 B2 | 5/2017 | Curts et al. | |
| 9,689,395 B2 | 6/2017 | Hartman | |
| 9,718,527 B2 | 8/2017 | Ito | |
| 9,729,802 B2 | 8/2017 | Frank et al. | |
| 9,764,807 B2 | 9/2017 | Frisbie et al. | |
| 9,802,684 B2 | 10/2017 | Sheedy et al. | |
| 9,828,075 B1 | 11/2017 | Hartman | |
| 9,873,491 B2 | 1/2018 | Hartman | |
| 9,904,293 B1 | 2/2018 | Heap et al. | |
| 9,944,317 B2 | 4/2018 | Lee | |
| 9,950,771 B1 | 4/2018 | Hartman et al. | |
| 10,055,648 B1 | 8/2018 | Grigsby et al. | |
| 10,093,398 B1 | 10/2018 | Hartman | |
| 10,141,903 B2 | 11/2018 | Goeppner | |
| 10,143,907 B2 | 12/2018 | Gentil | |
| 10,150,540 B2 | 12/2018 | Lake et al. | |
| 10,282,622 B2 | 5/2019 | Togashi et al. | |
| 10,372,976 B2 | 8/2019 | Kollmann et al. | |
| 10,386,834 B2 | 8/2019 | Green et al. | |
| 10,414,470 B1 | 9/2019 | Hartman | |
| 10,577,054 B1 | 3/2020 | Hartman et al. | |
| 10,640,182 B1 | 5/2020 | Hartman | |
| 10,717,502 B1 | 7/2020 | Hartman | |
| 10,759,507 B2 | 9/2020 | Hartman | |
| 10,782,691 B2 | 9/2020 | Suresh et al. | |
| 10,793,245 B1 | 10/2020 | Trotter | |
| 10,931,934 B2 | 2/2021 | Richards et al. | |
| 11,048,469 B2 | 6/2021 | Lynema et al. | |
| 11,254,391 B2 | 2/2022 | Larson et al. | |
| 11,618,538 B2 * | 4/2023 | Gonring | B63B 45/02 |
| | | | 701/21 |
| 11,643,174 B2 | 5/2023 | Kato et al. | |
| 12,024,269 B2 * | 7/2024 | Uggeri | B63B 34/60 |
| 2002/0052159 A1 | 5/2002 | Eguchi | |
| 2004/0049344 A1 | 3/2004 | Simon et al. | |
| 2007/0188616 A1 | 8/2007 | Goodwin | |
| 2008/0112577 A1 | 5/2008 | Crew | |
| 2010/0014691 A1 | 1/2010 | Moseley et al. | |
| 2017/0038771 A1 | 2/2017 | Green et al. | |
| 2017/0158297 A1 | 6/2017 | Sampson | |
| 2018/0050769 A1 | 2/2018 | Robinson et al. | |
| 2018/0314487 A1 | 11/2018 | Lynema et al. | |
| 2019/0228634 A1 | 7/2019 | Page | |
| 2020/0050893 A1 | 2/2020 | Suresh et al. | |
| 2020/0369351 A1 | 11/2020 | Behrendt et al. | |
| 2020/0398951 A1 | 12/2020 | Hartman | |
| 2021/0094661 A1 | 4/2021 | Schmid et al. | |
| 2022/0089259 A1 | 3/2022 | Williams et al. | |

OTHER PUBLICATIONS

The Boost Box; Watersport Innovations; http://watersportinnovations. com (accessed Jun. 10, 2021).

Wakeboard Pro User's Manual for Version 6.4; available at https:// www.planetnautique.com/CorrectCraftManuals/PerfectPass/ WakeBoardGuide.pdf (downloaded Jun. 10, 2021).

Auto Volume; Axis Wakeboard Boat Forum; http://axiswakeboardboats. com/viewtopic.php?f=14&t=3316 (accessed Jun. 10, 2021).

Jim Dowd and Dr. Steve Zalek; Independent Surf System Study, Mastercraft Gen 2 vs Malibu Surf Gate; Aug. 2014.

Wakeye WTG Wakeboard Tower GoPro Mount; Pintrest; https:// www.pinterest.com/pin/wakeye-wtg-wakeboard-tower-gopro-mount— 320037117240723426/ (accessed Feb. 24, 2021).

Partial Search Report and Preliminary Opinion dated Nov. 11, 2022, in International Application No. PCT/US2022/035900.

* cited by examiner

S905 — DEFINE AN ANALYSIS REGION IN THE IMAGE TO BE ANALYZED

S910 — IDENTIFYING WHETHER OR NOT AN OBJECT INDICATIVE OF THE WATER-SPORTS PARTICIPANT IS PRESENT IN THE ANALYSIS REGION

S915 — OBJECT PRESENT?

YES

NO

S920 — WATER-SPORTS PARTICIPANT HAS NOT FALLEN

WATER-SPORTS PARTICIPANT HAS FALLEN — S925

SYSTEM AND METHOD FOR IDENTIFYING WHEN A WATER-SPORTS PARTICIPANT HAS FALLEN

CROSS-REFERENCE TO RELATED APPLICATIONS

This application is a continuation of U.S. patent application Ser. No. 17/855,963, filed Jul. 1, 2022. U.S. patent application Ser. No. 17/855,963 claims the benefit under 35 U.S.C. § 119 (e) of U.S. Provisional Patent Application No. 63/218,254, filed Jul. 2, 2021, and titled "SYSTEM AND METHOD FOR IDENTIFYING WHEN A WATER-SPORTS PARTICIPANT HAS FALLEN," the entirety of which is incorporated herein by reference.

FIELD OF THE INVENTION

The invention relates to boats, particularly boats used for water sports.

BACKGROUND OF THE INVENTION

Boats are used to tow water-sports participants, such as water skiers, wakeboarders, and the like, using a towline. For water skiing and wakeboarding, the participant holds onto one end of the towline and the other end is attached to the boat. For tubing, the towline is attached to the tube, and the water-sports participant(s) holds onto the tube. A boat may also be used to generate a wake on which a water-sports participant, such as a wake surfer or foiler, may wake surf or foil, generally without holding onto a towline, once they get going. In each of these activities, the water-sports participant is located behind (aft) of the boat.

SUMMARY OF THE INVENTION

In one aspect, the invention relates to a boat including an image processor and/or a controller configured to determine if a water-sports participant has fallen. The controller may be configured to execute a rider-down action when the image processor determines that the water-sports participant has fallen.

In another aspect, the invention relates to methods for determining if a water-sports participant has fallen. The method may include analyzing, using an object recognition process executed by an image processor, an image to be analyzed to determine if the water-sports participant has fallen. The image to be analyzed includes the environment aft of the stern of a boat.

In a further aspect, the invention relates to a boat including a stern, an image sensor, an image processor communicatively coupled to the image sensor, and a controller communicatively coupled to the image processor. The image sensor is positioned on the boat to have a field of view of an environment aft of the stern of a boat. The image sensor is configured to capture at least one image of the environment aft of the stern of a boat. The environment captured in the at least one image includes a water surface aft of the boat. The image processor is configured to execute a rider-down analysis. The rider-down analysis includes receiving the at least one image from the image sensor and analyzing, using an object recognition process executed by the image processor, an image to be analyzed to determine if a water-sports participant has fallen. The image to be analyzed includes the at least one image captured by the image sensor. The controller is configured to execute a rider-down action based upon the rider-down analysis. The controller executes the rider-down action when the image processor determines that the water-sports participant has fallen.

In a still another aspect, the invention relates to a boat including a stern, an image sensor, and an image processor communicatively coupled to the image sensor. The image sensor is positioned on the boat to have a field of view of an environment aft of the stern of a boat. The image sensor is configured to capture at least one image of the environment aft of the stern of a boat. The environment captured in the at least one image including a water surface aft of the boat. The image processor is configured to receive the at least one image from the image sensor; define an analysis region in an image to be analyzed; identify, using an object recognition process executed by the image processor, whether or not an object indicative of a water-sports participant is present in the analysis region; and determine that the water-sports participant has fallen when the object indicative of the water-sports participant is not present in the analysis region. The image to be analyzed includes the at least one image captured by the image sensor. The analysis region includes a portion of the water surface corresponding to a set distance range behind the boat.

In a still further aspect, the invention relates to a boat including a propulsion system, an audio system, and a controller operatively coupled to the audio system. The propulsion system includes a propulsion motor and a propulsor. The audio system includes at least one speaker and an audio source. The controller is configured to monitor the propulsion system to detect a rapid deacceleration and to pause playing the audio from the audio source when the controller detects the rapid deacceleration.

These and other aspects of the invention will become apparent from the following disclosure.

BRIEF DESCRIPTION OF THE DRAWINGS

FIG. 8A shows an image with a wakeboarder engaged in wakeboarding (rider up). FIG. 8B shows an image in which the wakeboarder has fallen. FIG. 8C shows another image with a water-sports participant having fallen.

FIG. 10A shows an image with a wake surfer surfing (rider up). FIG. 10B shows an image in which the surfer has fallen.

FIG. 12A shows an image with water-sports participants on a tube (rider up). FIG. 12B shows an image where at least one water-sports participants has fallen of the tube.

FIG. 14A is a first image captured by the image sensor, and shows an image with a wake surfer surfing (rider up). FIG. 14B shows a second image subsequent to the first image, and FIG. 14C shows a third image that is also subsequent to the first image.

DETAILED DESCRIPTION OF THE PREFERRED EMBODIMENTS

As used herein, directional terms forward (fore), aft, inboard, and outboard have their commonly understood meaning in the art. Relative to the boat, forward is a direction toward the bow, and aft is a direction toward the stern. Likewise, inboard is a direction toward the center of the boat, and outboard is a direction away from it.

The boat is operated by a driver (or operator) at a control console to move the boat through the water for water sports, such as those discussed above. When the boat is underway (or driven), the driver needs to look forward to operate the boat, keeping it on course and avoiding navigational hazards, such as other vessels or submerged or partially-submerged objects. But maintaining awareness of the boat operator's surroundings requires being aware of what is going on behind the boat as well, particularly when a water-sports participant is behind the boat. When a water-sports participant falls, the driver should stop or slow the boat and then maneuver the boat to pick up the water-sports participant, or otherwise help the water-sports participant restart the water sport. It is desirable to identify when a water-sports participant falls as soon as possible, but with the driver looking forward, there may be a delay before the driver realizes that the water-sports participant has fallen. The embodiments described herein relate to systems and methods that can be used to identify when the water-sports participant has fallen and provide a notification (or other action) to alert the driver so that he or she can take action as quickly as possible.

Figure 1:
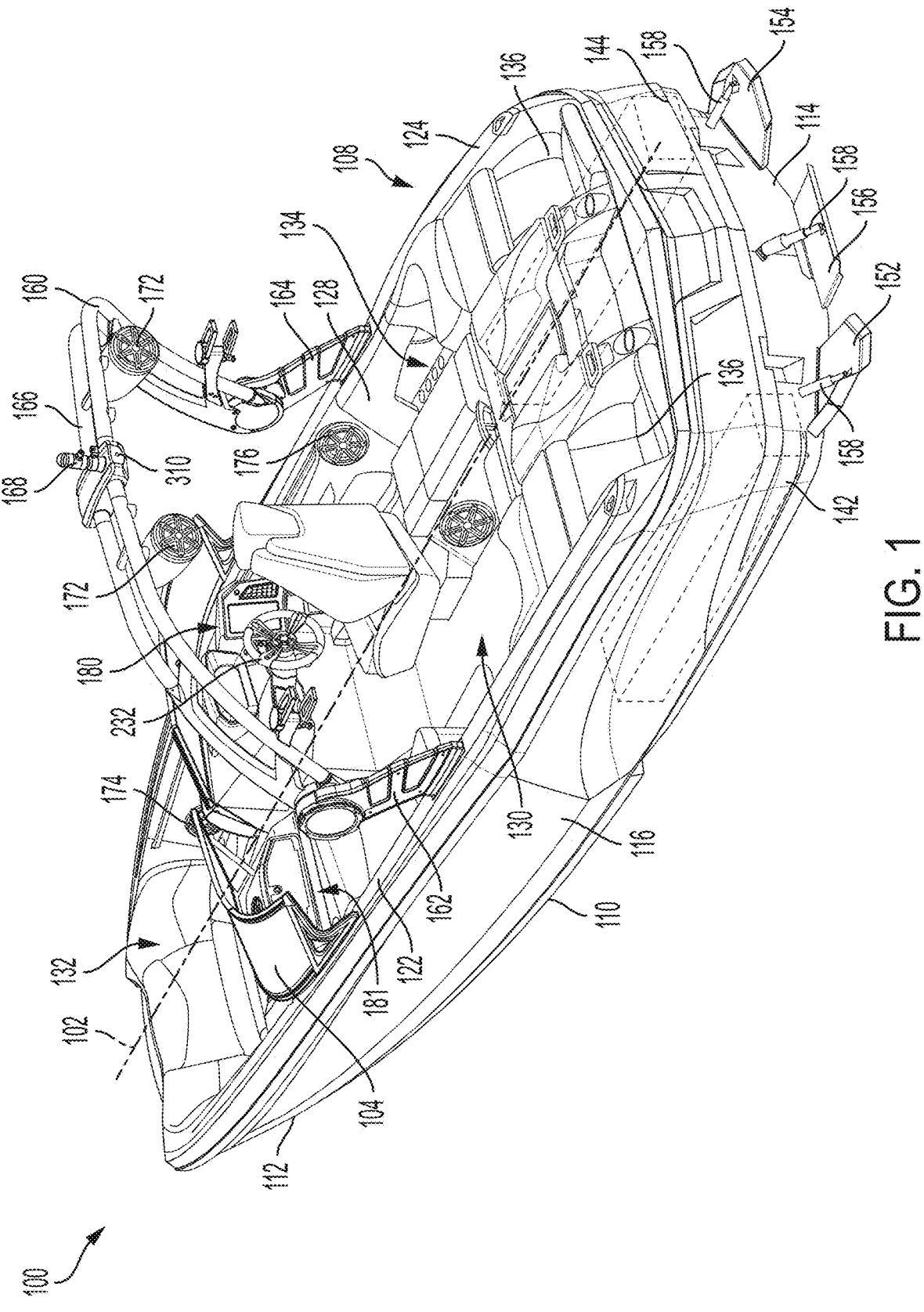
FIG. 1 shows a boat according to a preferred embodiment of the invention.
Figure 2:
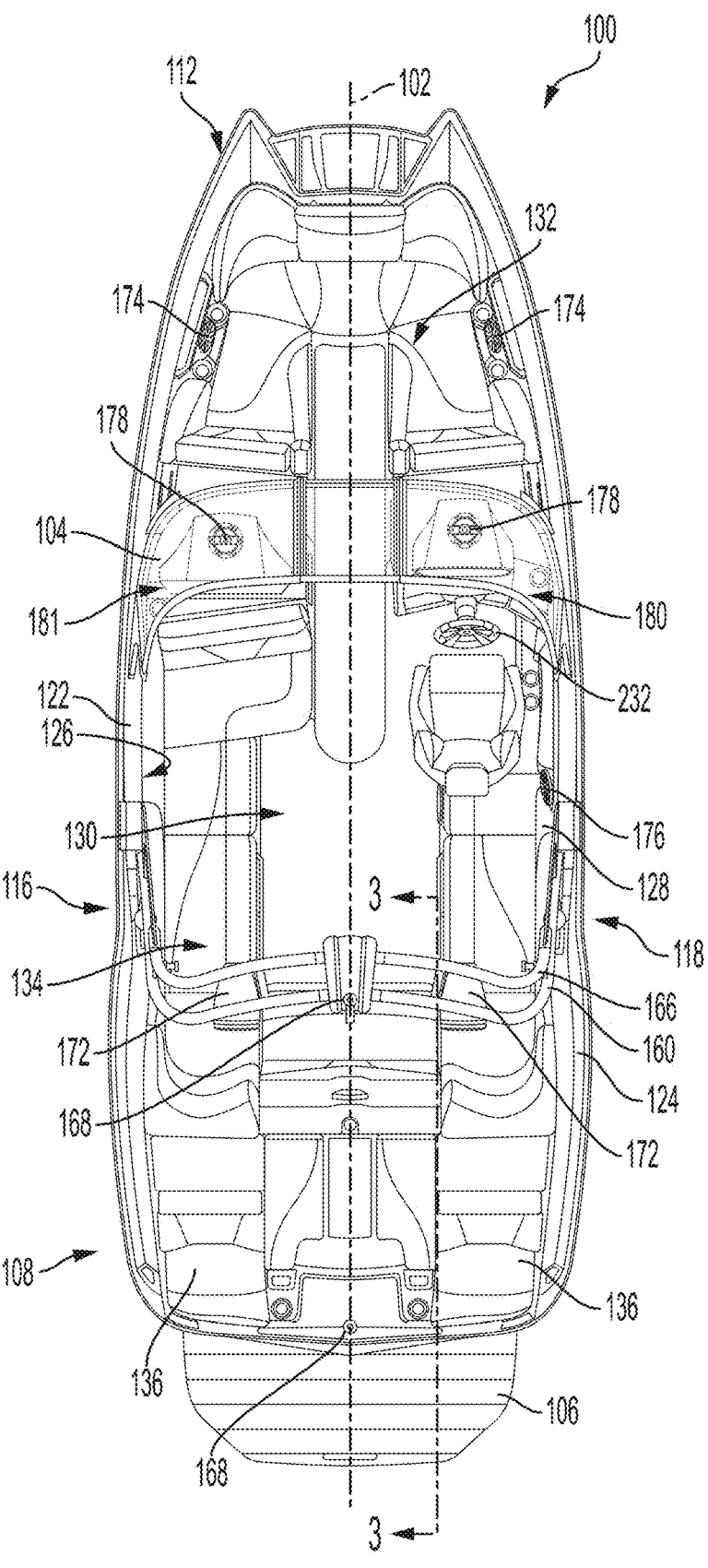
FIG. 2 is a top view of the boat shown in FIG. 1.

FIGS. 1 and 2 show a boat 100 in accordance with an exemplary preferred embodiment of the invention. The boat 100 includes a hull 110 with a bow 112, a transom 114, a port side 116, and a starboard side 118. The port side 116 and starboard sides 116, 118 have port and starboard gunwales 122, 124, respectively. The boat 100 has a centerline 102 running down the middle of the boat 100, halfway between the port and starboard sides 116, 118. Collectively, the bow

112, the transom 114, and the port and starboard sides 116, 118 define an interior 130 of the boat 100.

In the embodiment shown in FIGS. 1 and 2, the boat 100 is a bowrider having both a bow seating area 132 positioned in the bow 112 of the boat 100 and a primary seating area 134 (sometimes also referred to as the cockpit) positioned aft of a windshield 104. The boat 100 shown in FIGS. 1 and 2 also has a pair of aft-facing seats 136, such as those described in U.S. Pat. No. 9,650,117, which is incorporated by reference herein in its entirety. Although described in reference to a bowrider, this invention may be used with any suitable deck arrangement (boats), including cuddies, center consoles, or cruisers, for example. The invention is also not limited to boats with single decks but may also be used with other boats that have multiple decks, such as a flybridge. The invention discussed herein may also be used with pontoon boats and multi-hull boats.

The boat 100 includes a horizontal swim platform 106 attached to the transom 114 to make it easier for people to get into the water from the boat 100 or into the boat 100 from the water. A top view of the swim platform 106 is shown in FIG. 2, but the swim platform is omitted from FIG. 1 for clarity. The swim platform 106 should be capable of supporting a human, and the swim platform 106 is preferably capable of supporting at least 500 lbs. and, even more preferably, 1250 lbs. The swim platform 106 may be constructed from any suitable material that may be used in a marine environment, including for example, fiberglass or teak. In this embodiment, the swim platform 106 is attached to the transom 114 of the boat 100 using two brackets screwed to the transom 114; however, the swim platform 106 may be attached to the transom 114 by any suitable means. While the swim platform 106 is described as an attachable/detachable platform, it is not so limited. For example, the swim platform 106 may be integrally formed with the stern 108 of the boat 100.

The boat 100 shown in FIG. 1 is a recreational boat and, more specifically, a recreational sport boat that may be used for water sports, such as water skiing, wakeboarding, wake surfing, wake foiling, and tubing. The boat 100 thus may be equipped with water sport accessories or systems to facilitate the use of the boat 100 with such activities. These water-sport accessories and systems include, for example, devices that interact with the water and are capable of enhancing or otherwise adjusting the wake produced by the boat 100 and tow points for towing water-sports participants.

The boat 100 may include the capability to add ballast. Ballast may be used to increase the weight and displacement of the boat 100 and increase the size of the wake for water sports, such as wakeboarding or wake surfing. Any suitable means to add ballast may be used, including ballast bags (sacks) or ballast tanks. The boat 100 shown in FIG. 1 includes three ballast tanks. The boat 100 includes a stern 108, and preferably, two ballast tanks are positioned in the stern 108 of the boat near the bottom of the hull, one on each side of the boat (a port ballast tank 142 and a starboard ballast tank 144), and a third ballast tank (not shown) is positioned along the boat's centerline near the bottom of the hull, forward of the two stern ballast tanks 142, 144. Ballast bags may be used in addition to the ballast tanks and may be plumbed into the ballast system of the boat 100. Preferably, the ballast bags are positioned above the stern ballast tanks 142, 144 in a compartment underneath the aft-facing seats 136. Both the ballast tanks and the ballast bags operate similarly in that water may be pumped into the tank or bag by ballast pumps to add weight. Any suitable ballast system and arrangements tanks, bags, and the like may be used, including, for example, the ballast systems disclosed in U.S. Pat. No. 11,254,391, which is incorporated by reference herein in its entirety.

The boat 100 may be equipped with surf devices 152, 154, which may be used to shape the wake of the boat for wake surfing. Any suitable surf devices may be used, including, for example, the port and starboard wake-modifying devices disclosed in U.S. Pat. No. 8,833,286, which is incorporated by reference herein in its entirety. Each of the port and starboard surf devices 152, 154 includes a plate-like member that is pivotably attached to the transom 114 of the boat 100. The plate-like members pivot about pivot axes to move between a non-deployed position and a deployed position. In this embodiment, the pivot axes are hinges. Here, the hinges are piano hinges that are welded to a leading portion of each plate-like member and attached to the transom 114 of the boat 100 using screws. However, any suitable pivotable connection may be used and may be affixed to the transom 114 of the boat 100 and the port and starboard surf devices 152, 154 using any suitable means, including but not limited to bolts, screws, rivets, welding, and epoxy. Each of the port and starboard surf devices 152, 154 also may include one or more downturned and/or upturned surfaces, such as down-turned surfaces at the trailing edge of the plate-like members that are angled at a downward angle relative to the plate-like member. However, as noted above, any suitable surf device may be used, and other suitable surf devices may include, for example, the port and starboard wake-modifying devices disclosed in U.S. Pat. No. 9,802,684, which is incorporated by reference herein in its entirety.

As shown in FIG. 1, the boat 100 is also equipped with a central trim device (center tab 156) positioned to span the centerline 102 of the boat. Any suitable trim device may be used, but in this embodiment, the center tab 156 is a generally rectangular trim tab that is pivotably attached to the transom 114 of the boat 100. The center tab 156 includes a plate-like member and pivots about a pivot axis to move between a non-deployed position and a deployed position. Like the pivot axes of the surf devices 152, 154, the pivot axis of the center tab 156 may be any suitable pivotable connection affixed to the transom 114 of the boat 100.

Each of the surf devices 152, 154 and the center tab 156 is movable between the deployed position and the non-deployed position by a drive mechanism 158. In the embodiment shown, one drive mechanism 158 is used for each surf device 152, 154 and the center tab 156, allowing them to be independently operated. Each of the drive mechanisms 158 shown in this embodiment is a linear actuator. The linear actuator may be an electric linear actuator or an electro-hydraulic actuator (EHA). A suitable electric linear actuator may be one from Lenco Marine of Stuart, Florida, and a suitable electro-hydraulic actuator (EHA) may be one available from Parker Hannifin of Marysville, Ohio. One end of the linear actuator is connected to the transom 114 of the boat 100, and the other end is connected to the surf device 152, 154 or center tab 156. Any suitable means may be used to move the surf devices 152, 154 and the center tab 156 between the deployed and non-deployed positions, including but not limited to hydraulic linear actuators, gas assist pneumatic actuators, and electrical motors.

The boat 100 is also equipped with an apparatus for towing a water-sports participant. As shown in FIGS. 1 and 2, the towing apparatus is a tower 160 that is particularly used for towing a wakeboarder. Any suitable tower 160 may be used, including, for example, those described in U.S. Pat. Nos. 9,580,155 and 10,150,540, which are incorporated by reference herein in their entireties. The tower 160 includes two legs: a port leg 162 and a starboard leg 164. The port leg 162 is attached on the port side of the centerline 102 of the boat 100, and the starboard leg 164 is attached on the starboard side of the centerline 102 of the boat 100. Preferably, the port and starboard legs 162, 164 are attached to the port gunwale 122 and to the starboard gunwale 124, respectively. The tower 160 also includes a header 166. The header 166 is connected to an upper portion of each of the two legs 162, 164 and spans the interior 130 of the boat 100 at a height suitable for passengers to pass underneath while standing. In addition, the tower 160 has a towline-attach-ment structure 168 at an upper portion of the tower 160 (the header 166 in this embodiment). This towline-attachment structure 168 may be used to connect a towline suitable for towing a water-sports participant, such as a wakeboarder. Any suitable towline-attachment structure may be used, including but not limited to the integrated light and towline-attachment assembly disclosed in U.S. Pat. No. 6,539,886, which is incorporated by reference herein in its entirety. Additionally or alternatively, towline-attachment structures 168 may be located elsewhere on the boat, such as on the transom 114 or a portion deck in the stern 108. Such lower towline-attachment structures 168 are preferably used for water sports like tubing.

Figure 5:
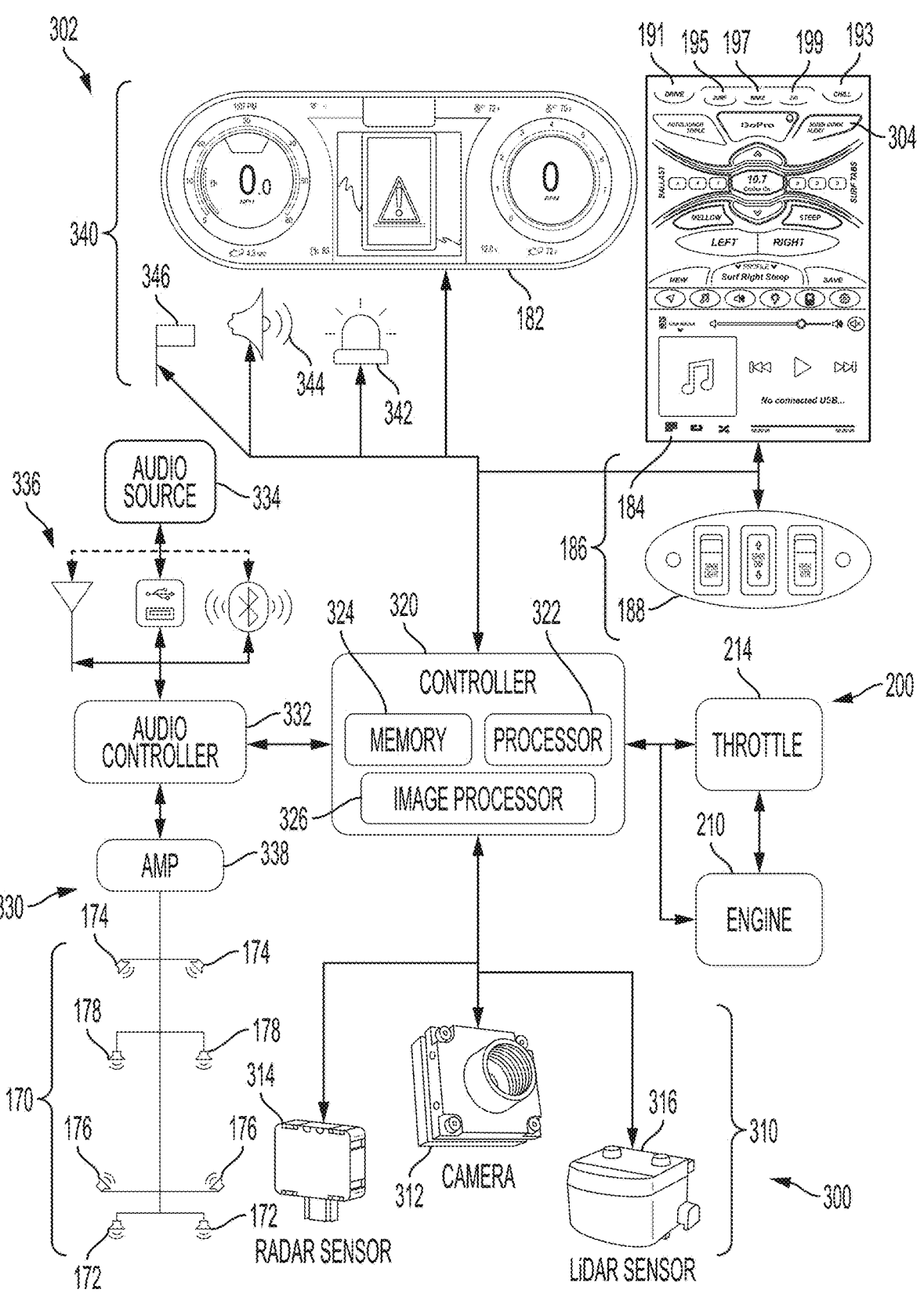
FIG. 5 is a schematic diagram of a control system for the boat shown in FIG. 1, including a rider analysis system.

The boat 100 also includes an audio system 330 (see FIG. 5). Sound is output from the audio system 330 by speakers 170 (see FIG. 5) positioned throughout the boat 100. The speakers 170 may be located in any suitable location in or on the boat 100. In this embodiment, at least two speakers are attached to the tower 160 and are positioned to direct sound in an aft direction. These are referred to herein as tower speakers 172 and may be used, for example, to project sound outside of the boat and when applicable, to a water-sports participant, such as a wakeboarder, surfer, skier, foiler, tuber, and the like. Preferably, the tower speakers 172 are attached to the underside of the header 166.

Speakers may also be positioned within the interior 130 of the boat 100 to provide sound to the occupants of the boat. For example, two speakers may be located in the bow 112 of the boat (bow speakers 174) to project sound in the bow seating area 132, and at least two speakers (cockpit speakers 176) may be located in the primary seating area 134 to project sound into the primary seating area 134. The interior 130 of the boat 100 includes port and starboard sidewalls 126, 128. The bow speakers 174 and cockpit speakers 176 may be located on port and starboard sidewalls 126, 128 and below the gunwales 122, 124. The boat 100 may also include dash speakers 178 located in each of a control console 180 and a passenger-side console 181.

Figure 3:
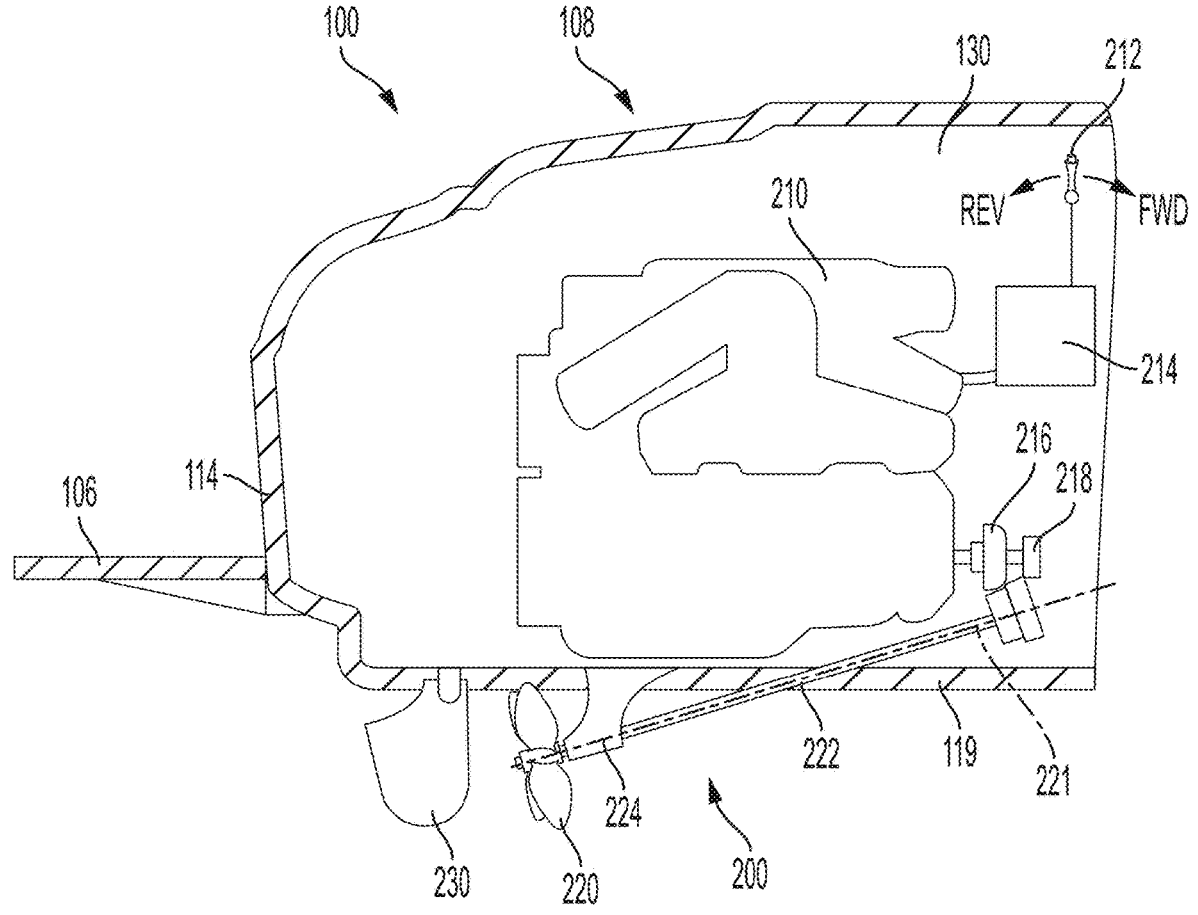
FIG. 3 is a cross-sectional view, taken along line 3-3 in FIG. 2, of a stern of the boat shown in FIG. 1, showing the propulsion system.

FIG. 3 is a cross-sectional view, taken along line 3-3 in FIG. 2, of a stern 108 of the boat 100 shown in FIG. 1, showing a propulsion system 200 of the boat 100. The boat 100 of this embodiment is an inboard boat. However, this invention can be utilized with other types of boats and propulsion systems, including but not limited to outboard motors, sterndrives, jet drives, and the like. The propulsion system 200 includes a motor operatively coupled to a propulsor to drive the propulsor. In this embodiment, the motor is a combustion engine 210, but other suitable motors may be used, including electrical motors. The propulsor of this embodiment is a propeller 220, but other suitable propulsors may be used, such as, for example, impellers in jet drives. The engine 210 is configured to drive (rotate) the propeller 220, and in this embodiment, the engine 210 is connected to the propeller 220 by a drive shaft 222. The engine 210 is located within the interior 130 of the boat 100, and the drive shaft 222 extends through the hull bottom 119.

The engine 210 is coupled to the drive shaft to rotate the drive shaft 222, and thus the propeller 220. The drive shaft 222 rotates about a rotation axis 221 of the drive shaft 222. A strut 224 extends from the hull bottom 119 to support the drive shaft 222 and the propeller 220. The drive shaft 222 extends through a bushing in the strut 224. The propeller 220 is positioned beneath the hull bottom 119 and forward of the transom 114. The propulsion system 200 of this embodiment, specifically, the engine 210 and the drive shaft 222, is arranged in a V-drive arrangement, allowing the engine 210 to be located aft in the stern 108 of the boat 100 and further increasing the displacement of the stern 108 of the boat 100 for water sports, such as wake surfing or wake boarding. The propulsion system 200 may be arranged in other inboard arrangements, such as a direct drive arrangement, which may be preferred for water ski boats where increased displacement is not desired.

A rudder 230 for turning the boat 100 is positioned behind (aft of) the propeller 220. A user may turn the boat 100 by rotating a steering wheel 232 (see FIG. 4) located at the control console 180. The steering wheel 232 is coupled to the rudder 230 such that turning the steering wheel 232 rotates the rudder 230. Any suitable steering system may be used, including mechanical rack-and-pinion systems connected to the rudder by mechanical linkages, hydraulic steering systems, electronic steering systems, or the rudder system shown and described in U.S. Pat. No. 9,611,009, which is incorporated by reference herein in its entirety. In other embodiments, for example, the steering wheel 232 may rotate the marine drive for outboard or sterndrives, or the nozzle for jet drives.

In this embodiment, the engine 210 and the propeller 220 may be operated by a user at the control console 180 (discussed further below with reference to FIG. 4). The control console 180 may include a control lever 212 that operates a throttle 214 of the engine 210 and engages the engine 210 with the drive shaft 222. The control lever 212 has a neutral position, and the user may move the control lever 212 forward from the neutral position to engage a running gear 216 with the drive shaft 222, accelerate the engine 210 using the throttle 214, and rotate the propeller 220 in a first direction, such as counterclockwise, to drive the boat 100 forward. To move the boat 100 in reverse, the user may move the control lever 212 back from the neutral position to engage a reverse gear 218 with the drive shaft 222, accelerate the engine 210 using the throttle 214, and rotate the propeller 220 in a second direction opposite the first direction, such as clockwise. Any suitable means may be used to operate the engine 210 and engage it with the drive shaft 222.

Figure 4:
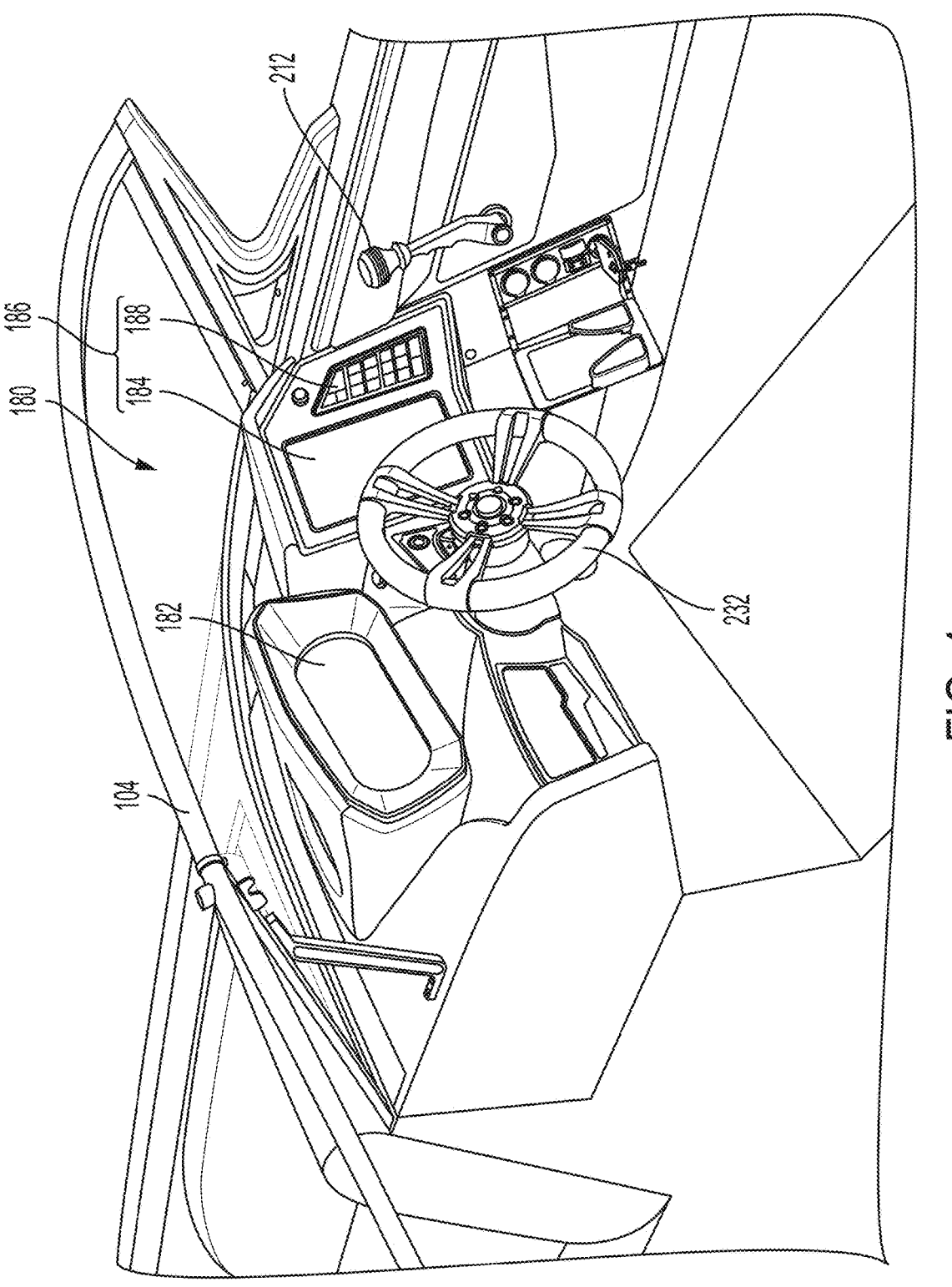
FIG. 4 is a perspective view of a control console of the boat shown in FIG. 1.

FIG. 4 shows the control console 180 for operating the boat 100. Here, the control console 180 is positioned on the starboard side of the boat 100 proximate to and aft of the windshield 104. The control console 180 is used to support and enclose various controls for operating the boat 100. As noted above, the steering wheel 232 and the control lever 212 are located at the control console 180. The control console 180 may also include at least one display screen. In this embodiment, the control console 180 includes two display screens, a center display 182 and a side display 184.

The center display 182 may be positioned and oriented so that the operator can be aware of the information displayed on the center display 182 without substantially deviating his or her attention from the boat's heading. In this embodiment, for example, the center display 182 is located at the top of the dash above and forward of the steering wheel 232 so that the operator is able to view the information displayed on the center display 182 without turning his or her head. Although the center display 182 may be a touchscreen, the center display 182 in this particular embodiment is not because of the positioning of the center display 182 and the type of information displayed on it. The positioning of the center display 182 makes it difficult or awkward for a user to reach with his or her hand, so to the extent that user-selectable options are displayed on the center display 182, they may be selected by using a switch pad or another suitable input device (user interface).

The control console 180 includes input devices 186 that are used to select various functions or options and operate various features and systems of the boat. Such input devices 186 may be operator controls. Many of the input devices 186 on the boat 100 may be conveniently located on the control console 180 to the side of the steering wheel 232. In this embodiment, the input devices 186 are located on the outboard side of the steering wheel 232 and can be conveniently operated by the operator's right hand. One of the main input devices 186 in this embodiment is the side display 184. In this embodiment, the side display 184 is a 10 inch, rectangular, touchscreen display that has a portrait orientation, and a plurality of user-selectable elements (controls) are displayed on the side display 184. Other input devices 186 (controls) may include other static buttons and switches that are part of, for example, a switch pack 188. These static buttons and switches are another example of user-selectable elements (controls).

As noted above, the boat 100 discussed herein may be used for water sports. When the boat 100 is being used for such activities, the driver (or operator) is located at the control console 180 as the boat 100 moves through the water with a water-sports participant behind the boat 100. When the boat 100 is underway (or driven), the driver looks forward to operate the boat, keeping it on course and avoiding navigational hazards, such as other vessels or submerged or partially-submerged objects, but when a water-sports participant falls, the driver should stop or slow the boat and then maneuver the boat to pick up the water-sports participant. The water-sports participant may also be referred to herein as a rider. The rider is up when the rider is engaged in the water sport while being pulled by the boat 100 or propelled by the wake of the boat 100, and the rider is down when the rider falls or is otherwise not being pulled by the boat 100 or propelled by the wake of the boat 100. Embodiments discussed herein use a rider analysis system 300 to assist in identifying when the rider is down.

FIG. 5 is a schematic diagram of a control system 302 for the boat 100 shown in FIG. 1, including the rider analysis system 300. The rider analysis system 300 may be used to provide alerts and or other notifications to the operator or others in or within the vicinity of the boat 100. In other embodiments, the rider analysis system 300 may be used to implement or trigger other actions on the boat 100. The rider analysis system 300 is communicatively coupled to the control system 302 for the boat 100, and in this embodiment, the rider analysis system 300 is implemented within the control system 302 of the boat 100.

The rider analysis system 300 of the embodiments discussed herein utilizes an image sensor 310. As discussed further below, the image sensor 310 is positioned on the boat 100 to have a field of view of an environment aft of the stern 108 of a boat 100. The image sensor 310 may be equipped to sense and image the environment behind the boat 100 by any suitable means. Suitable image sensors 310 may include visual image sensors (e.g., cameras that sense visual light to create still images or video images), infrared image sensors, radar image sensors, LiDAR image sensors, and the like. The image sensor 310 has a field of view, which is the area captured, or imaged, by the image sensor. In some embodiments, multiple image sensors may be used, such as, for example, multiple image sensors of the same type (e.g., multiple video cameras) and/or image sensors of a different type (e.g., both a video camera and a LiDAR image sensor). The image sensors 310 shown schematically in FIG. 5 include a camera 312, a radar sensor 314, and a LiDAR sensor 316.

As shown in FIG. 1, the image sensor 310 of this embodiment is located on the tower 160 of the boat 100 and, more specifically, on the header 166 near the towline attachment structure 168 on the tower 160. Positioning the image sensor 310 on the tower 160 and, more specifically, on the header 166, provides the image sensor 310 with a wide and deep field of view behind the boat 100. The image sensor 310 is preferably located within a center region of the header 166, such as within one eighth of the beam width on either side of the centerline 102 of the boat 100. In this embodiment, the image sensor 310 is aligned with the centerline 102 of the boat 100.

Figure 6:
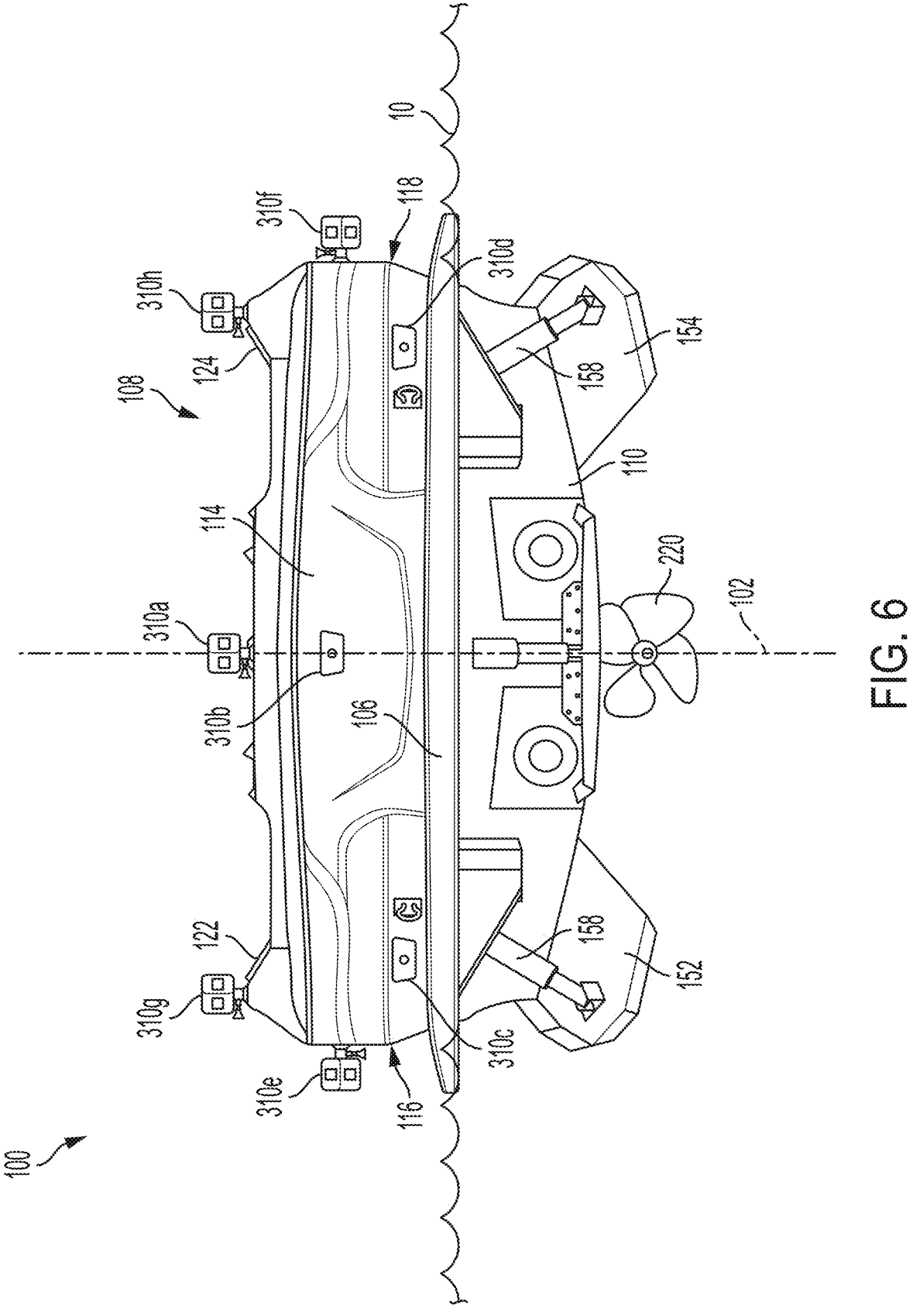
FIG. 6 is a transom view of the boat shown in FIG. 1, showing other suitable positions of the rider analysis system.

FIG. 6 shows other suitable positions for one or more image sensors on the boat 100. FIG. 6 is a view of the transom 114 of the boat. Preferably, the image sensor(s) will be positioned above the waterline 10 of the boat 100 so that it captures the surface of the water and any water-sports participant behind the boat 100. The image sensor(s) may be attached to a portion of the deck. In FIG. 6, for example, image sensor 310a is attached to the motor box. The image sensor(s) may also be attached to the hull 110, such as attached to (or otherwise positioned in) the transom 114 of the hull. Image sensors 310b, 310c, 310d are all attached to the transom 114 at a position above the swim platform 106. The image sensor(s) may be attached to other portions of the hull 110. For example, image sensor 310e is attached to the port side 116 of the hull 110, and image sensor 310f is attached to the starboard side 118 of the hull 110. Other suitable locations include, for example, the port gunwale 122 and the starboard gunwale 124. For example, image sensor 310g is attached to the port gunwale 122, and image sensor 310h is attached to the starboard gunwale 124.

Image sensor 310a and image sensor 310b are shown in a center region of the boat 100, such as within one eighth of the beam width on either side of the centerline 102, and, more specifically in this embodiment, image sensor 310a and image sensor 310b are aligned with the centerline 102 of the boat 100. Image sensor 310c and image sensor 310d are each positioned on an outer third of the boat 100, with image sensor 310c being on a port side of the centerline 102 of the boat 100, and image sensor 310d being positioned on a starboard side of the centerline 102 of the boat 100. The image sensors discussed above are fixed or otherwise attached to the boat. Image sensors that are not fixed to the boat 100 may also be used. Such image sensors may include, for example, a camera on a drone or a camera on a mobile phone.

As shown in FIG. 5, the control system 302 includes a controller 320. In this embodiment, the controller 320 is a microprocessor-based controller that includes a processor 322 for performing various functions discussed further below, and a memory 324 for storing various data. The controller 320 may also be referred to as a CPU. In one embodiment, the various methods discussed below may be implemented by way of a series of instructions stored in the memory 324 and executed by the processor 322. The rider analysis system 300 includes an image processor 326. In the embodiment shown in FIG. 5, the image processor 326 is incorporated into the controller 320 either as a separate processor or as the processor 322, and in this way the image processor 326 is communicatively coupled to the controller 320 as part of the controllers 320 internal connections. In other embodiments, the image processor 326 may be a processor that is part of a computing device (with its own memory) separate from the controller 320. When the image processor 326 is separate from the controller 320, the image processor 326 is communicatively coupled to the controller 320 to carry out the actions discussed below.

The image sensor 310 is communicatively coupled to the image processor 326 and, in this embodiment, is communicatively coupled to the controller 320. The image sensor 310 may be communicatively coupled to the controller 320 using any suitable means. In this embodiment, the image sensor 310 is coupled to the controller 320 with a wired connection, but other suitable connections may be used, such as wireless connections. Suitable connections include, for example, an electrical conductor, a low-level serial data connection, such as Recommended Standard (RS) 232 or RS-485, a high-level serial data connection, such as Universal Serial Bus (USB) or the Institute of Electrical and Electronics Engineers (IEEE) 1394, a parallel data connection, such as IEEE 1284 or IEEE 488, and/or a short-range wireless communication channel, such as BLUETOOTH, and/or wireless communication networks using radiofrequency signals, such as WiFi. When a wired connection and protocol is used, each of the image sensor 310 and the controller 320 may include a suitable port to support the wired connection. When a wireless protocol is used, each of the image sensor 310 and the controller 320 may include a transmitter and/or a receiver. The examples of image sensors 310 discussed above that are not fixed to the boat 100 may be wirelessly coupled to the image processor 326.

The controller 320 is also communicatively coupled to at least one display, and in this embodiment, is communicatively coupled to both the center display 182 and the side display 184. The controller 320 is configured to display on the center display 182 and the side display 184 various information that is pertinent to the operator, including the information and alerts discussed further below. Where the display, such as the side display 184, is a touch screen and thus functioning as an input device 186, the controller 320 is also configured to receive input from the side display 184. The side display 184 may display a plurality of user-selectable options or icons that may be selected by a user pressing the icon. The terms icon, virtual button, user-selectable element, and button will be used interchangeably herein to describe these and other user-selectable options displayed by the controller 320 on the side display 184. The controller 320 is operatively coupled to various systems on the boat 100. When the user selects a user-selectable element displayed on the side display 184, the controller 320 receives an input from the side display 184 and then executes a process based on the input from the side display 184. In a similar manner, the controller 320 is also configured to receive input from other input devices 186, such as the switch pack 188.

In some embodiments, the side display 184 (and center display 182) may implement dynamic controls, such as the dynamic controls discussed in U.S. Pat. No. 11,048,469, which is incorporated by reference herein in its entirety. Such dynamic controls may be implemented using modes. Each different mode corresponds to a different activity, and each mode includes a plurality of controls corresponding to the activity of the mode. The plurality of controls of each mode is a subset of the major controls of the boat 100. In some embodiments, there may be three different modes (a drive mode, a tow mode, and a chill mode), and when a mode is activated, the controller 320 displays on the side display 184 the plurality of controls in that mode. Similarly, each mode also includes a plurality of parameters of the boat 100 (also referred to herein as operational parameters) corresponding to the activity of the mode. These operational parameters are also a subset of the major operational parameters of the boat 100. The information displayed on the center display 182 changes based on the active mode, and the controller 320 displays on the center display 182 the plurality of parameters of the boat 100 corresponding to the activity of the mode. An example of the plurality of controls and plurality of operational parameters for each of the three modes is described in further detail in U.S. Pat. No. 11,048, 469.

As noted above, the control system 302 may include a plurality of modes, with at least one mode corresponding to a water sport and at least one mode corresponding to an activity other than the water sport (a non-water-sport mode). The control system 302 may also include a plurality of modes with each mode corresponding to a different water sport. In this embodiment, the controller 320 displays at the top of the side display 184 a plurality of user-selectable options to change between modes. Two non-water-sport modes, drive and chill, are shown in FIG. 5. The drive button 191 activates the drive mode, and the chill button 193 activates the chill mode. There are also a plurality of user-selectable options, each corresponding to a different water sport. In this embodiment, the plurality of user-selectable options includes buttons for wake surfing (surf button 195), another one of the water sports is wakeboarding (wake button 197), and the third water sport is water skiing (ski button 199), but the water sports and corresponding user-selectable options may be for any water sport including, for example, tubing.

The controller 320 is also communicatively and operatively coupled to the propulsion system 200, including, for example, in this embodiment, to the throttle 214 and the engine 210. In addition, the controller 320 is communicatively and operatively coupled to the audio system 330. The audio system 330 of this embodiment includes an audio controller 332. The audio controller 332 may be, for example, a head unit. The audio controller 332 may be a separate controller, as shown in FIG. 5, but in other embodiments, the audio controller 332 may be integrated in the controller 320 of the boat 100.

The audio system 330 receives audio signals from an audio source 334. The audio source may be any suitable audio source, including, for example, audio received by an AM/FM radio receiver; audio received by a satellite radio receiver; digital media stored on a digital media player, such as a mobile phone or iPod®; a digital streaming service using a device, such as a mobile phone that is communicatively coupled to a wireless network; and audio stored on a compact disc (CD) and played using a CD player. The audio source 334 may be integrated into the boat 100. For example, an AM/FM radio receiver may be built into the boat 100 and operated through the side display 184. The audio system 330 may also be configured to allow an external audio source 334 to be coupled to the audio system 330 using an audio input interface 336. The audio input interface 336 may include a 3.5 mm audio port, a universal serial bus (USB) port, a high-definition multimedia interface port, an optical interface port, or a short distance wireless receiver/transmitter. The short distance wireless receiver/transmitter may use the Bluetooth® protocol, for example. The audio signal from the audio input interface 336 is sent to an amplifier 338. The amplifier 338 is communicatively coupled to each of the speakers 170, and amplifies the audio signal for each speaker 170. The amplifier 338 transmits the amplified audio signal to each speaker 170, which in turn produces the audio sound.

Figure 7:
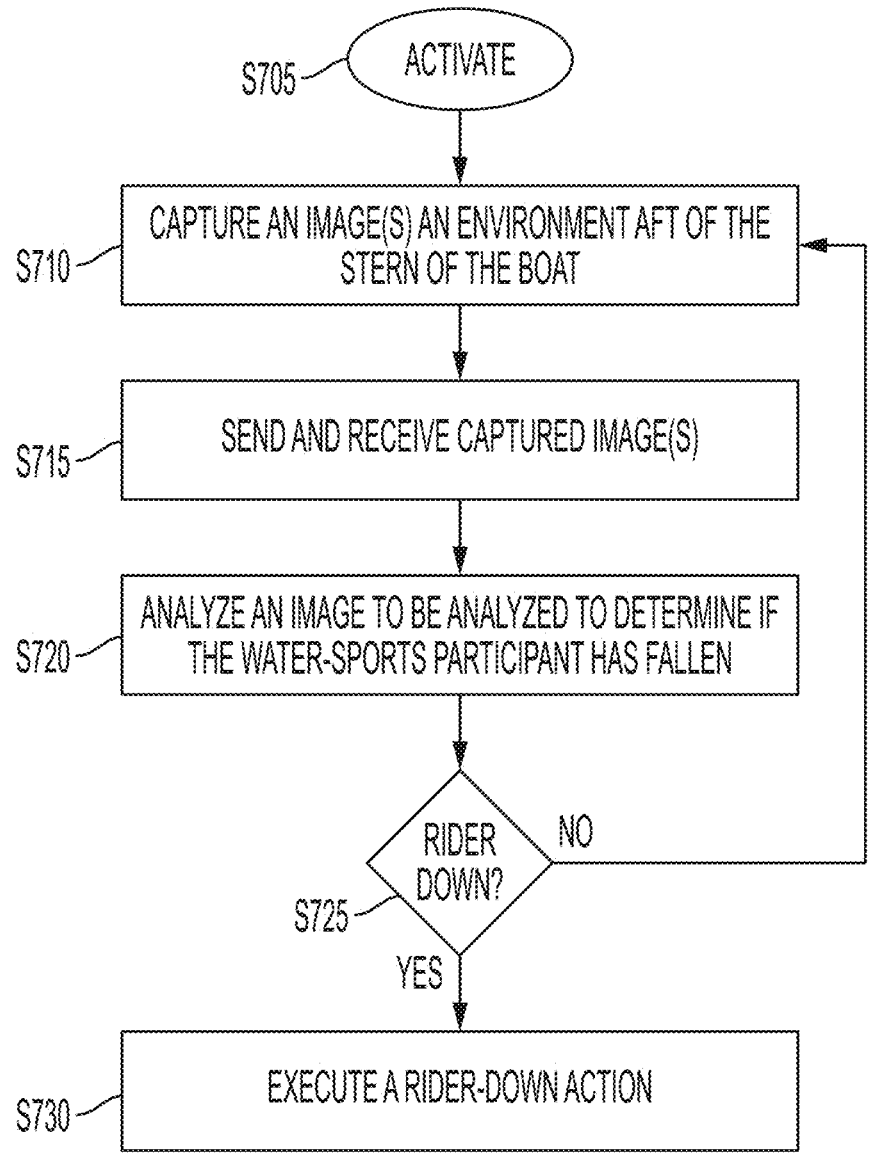
FIG. 7 is a flow chart of a process used by the rider analysis system to assist in identifying when the rider is down.
Figure 8A:
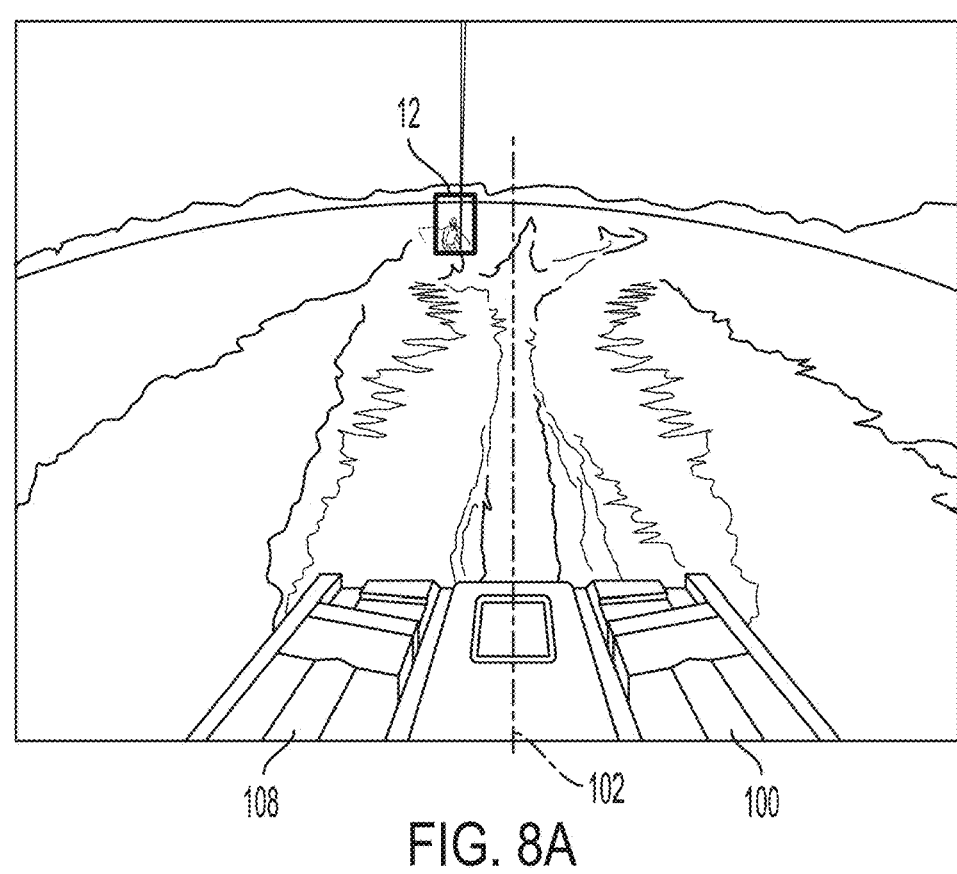
FIGS. 8A, 8B, and 8C are images captured by an image sensor of the rider analysis system as analyzed using a rider-down analysis.
Figure 8B:
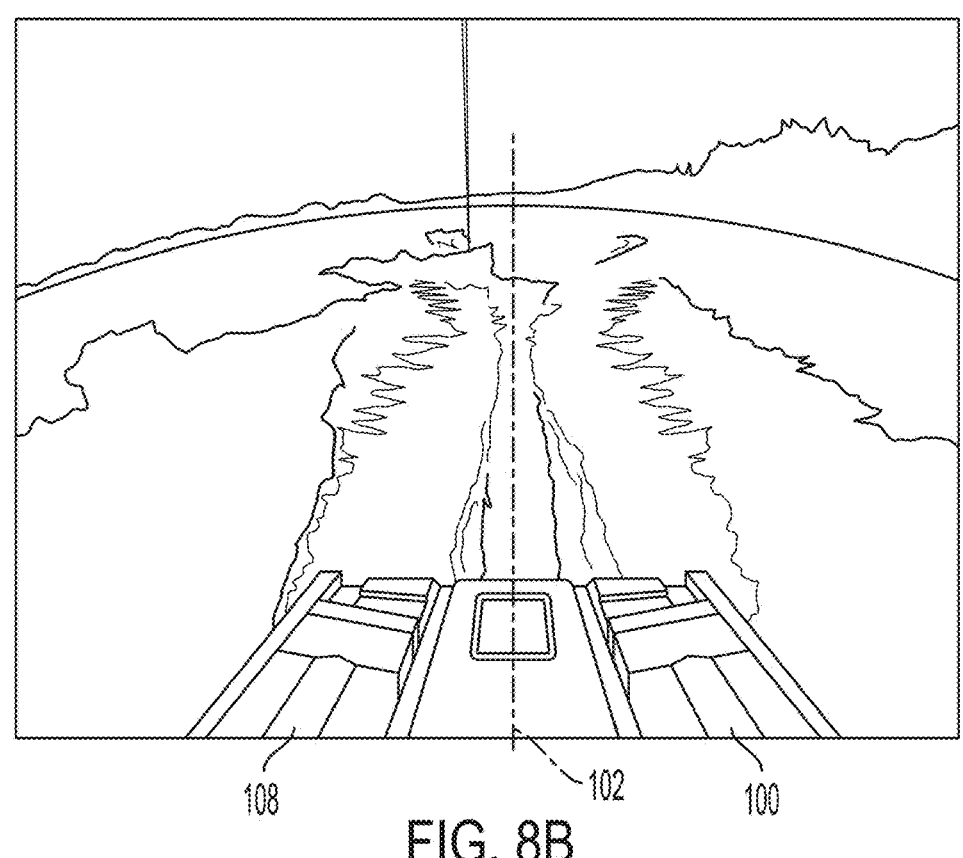

FIG. 7 is a flow chart of the general process used by the rider analysis system 300 to assist in identifying when the rider is down. The controller 320 activates the process in step S705. The image sensor 310 then captures, in step S710, at least one image of the environment aft of the stern 108 of the boat 100. As noted above, the image sensor 310 is located above the waterline 10, and the environment captured in the at least one image includes a water surface aft of the boat 100. FIGS. 8A and 8B are examples of images captured by the image sensor 310 and show the environment aft of the stern 108 of the boat 100. In the embodiments discussed herein, the image sensor 310 positioned on the tower 160 is used, and the image sensor 310 is a visual image sensor, such as a video camera 312. The captured images in the embodiments discussed herein are thus visual images. However, the following discussion is also applicable to other captured images using other image sensors positioned at other portions of the boat. For example, when the image sensor is an infrared image sensor, the rider 12 may be identified by their heat signature as compared to the background.

As noted above, the image sensor 310 has a field of view, which is the area captured or imaged by the image sensor. The field of view is preferably sized to provide sufficient resolution for the image processing discussed below. The field of view is preferably set to capture the normal range of the water-sports participant behind the boat 100 when the water-sports participant is engaged in the water sport. The centerline 102 of the boat 100 is shown in FIGS. 8A and 8B extending aft of the boat 100. A wide field of view is preferred to observe a water-sports participant that is a large distance from the centerline 102 of the boat 100. Such a field of view is preferred when the water sport is water skiing and wakeboarding, for example. In such water sports, the water-sports participant may be a large distance from the centerline 102 and moving quickly from one side to the other, such as a slalom skier that moves between buoys that are more than 38 feet from the centerline 102 of the boat 100. Accordingly, the field of view, for at least water skiing and wakeboarding, preferably is at least 50 feet on either side of the centerline 102 of the boat 100, but smaller widths also may be used. When the water sport is wake surfing, for example, the field of view preferably is at least 15 feet on either side of the centerline 102 of the boat 100.

The field of view in terms of the length behind the boat 100 is preferably set to account for the various water sports being performed. Preferably, the field of view will include the area just aft of the boat 100 to account for water sports, such as wake surfing, that occur close to the boat. Wake surfing often occurs with the water-sports participant at distances from 3 to 40 feet behind the transom of the boat 100. In some embodiments, it may be beneficial for the field of view to include the boat 100, in which case the field of view may include at least a portion of the stern 108 of the boat 100 and/or the swim platform 106. The field of view also preferably accounts for water sports that occur at distances farther from the transom of the boat 100. Such water sports include, for example, foiling, which often occurs with the water-sports participant at distances from 20 to 60 feet behind the transom of the boat 100; wakeboarding, which often occurs with the water-sports participant at distances from 45 to 80 feet behind the transom of the boat 100; water skiing, which often occurs with the water-sports participant at distances from 40 to 75 feet behind the transom of the boat 100; and tubing, which often occurs with the water-sports participant(s) at distances from 40 to 80 feet behind the transom of the boat 100.

As noted above, the field of view preferably includes the area where the person engaged in the water sport (referred to herein as the water-sports participant or rider) is expected to be located for the particular water sport. In some embodiments, the field of view may be dynamic and change based on the water sport being performed. The field of view may be changed based on receiving an input from a user selecting a particular field of view using controls on an input device 186, such as user-selectable options displayed on the side display 184, for example. The user may select the field of view by providing a specific input to set the field of view, and then the controller 320 controls the image sensor 310 to change the field of view. Such user inputs may include, for example, zoom and pan features. In response to such inputs, the controller 320 controls the zoom function of the image sensor or physically moves the image sensor using an electrical motor, for example. In other embodiments, the field of view may be predetermined based on the water sport. The controller 320 may have stored in the memory a set location (position and zoom) for the image sensor, and the controller 320 operates or otherwise moves the image sensor 310 to set the field of view when a user selects a user input corresponding to the water sport, such as when a particular mode is selected (e.g., selecting one of the surf button 195, the wake button 197, or the ski button 199), for example. Where the boat 100 is equipped with multiple image sensors 310, changing the field of view may include selecting a different image sensor 310. For example, when a surf left option is selected, the controller 320 may select an image sensor on the port side of the boat 100, such as one of image sensor 310*c*, image sensor 310*e*, or image sensor 310*g* (see FIG. 6). Likewise, when a surf right option is selected, the controller 320 may select an image sensor on the starboard side of the boat 100, such as one of image sensor 310*d*, image sensor 310*f*, or image sensor 310*h* (see FIG. 6).

Returning to the flow chart of FIG. 7, the image sensor 310 is configured to send the images captured by the image sensor 310 to the image processor 326, and the image processor 326 is configured to receive the images from the image sensor. The captured images are sent and received in step S715. Then, in step S720, the image processor 326 is used to analyze the images captured by the image sensor 310 to determine whether the water-sports participant has fallen. Such an analysis may be referred to herein as a rider-down analysis. To make such a determination, the image processor 326 may analyze an image to be analyzed to determine if the water-sports participant has fallen. The image to be analyzed includes the image captured by the image sensor 310. In some embodiments, a plurality of image sensors 310, for example, image sensor 310*c* and image sensor 310*d*, is used to create the image to be analyzed. The captured image from image sensor 310*c* and the image sensor 310*d* may be stitched together by the image processor 326 using a suitable image stitching process to combine each captured image into one image to be analyzed.

In analyzing the image in step S720, the image processor 326 executes an object recognition process to determine if the water-sports participant has fallen (in other words, is down) or if the water-sports participant has not fallen (in other words, is up). Any suitable object recognition process may be used. For example, an artificial neural network trained to identify the objects discussed herein may be used as the object recognition process. In another example, a facial recognition image analysis may be performed to identify and distinguish the face of a person from other objects in the image. Herein, this facial recognition is used not to specifically identify a person by individual characteristics of a specific person's face, but to distinguish a human face from other objects. Similar analyses can be conducted to identify other parts of a person's body, such as head, hands, arms, torso, legs, and the like. Such facial or body recognition techniques and algorithms include, for instance, intrinsic face movement, depth mapping algorithms, neural networks, 3D sensing techniques, texture detection, gesture detection, edge detection, and feature detection.

The captured images discussed in the following embodiments are visual images, which, as discussed above, are analyzed using suitable object recognition processes for visual images. Other image sensors 310 may be used, and suitable object recognition processes for such image sensors 310 may be used as part of step S720 to identify the objects discussed herein. For example, an infrared image sensor may be used, and the rider 12 may be identified by their heat signature as compared to the background. In some cases, the background will show as a cold environment, and the rider 12 will show as a hot object. This temperature difference can then be used to identify the location of the rider 12.

Various suitable methods and approaches may be used to determine if the water-sports participant has fallen based on the object recognition process. Examples of this determination will be described further below. Step S725 illustrates a decision point in the process. If the rider is still up (not fallen), the process returns to step S710 and the rider analysis system 300 continues to monitor the water-sports participant. But, if the rider is down (fallen), the process moves to step S730, and the controller 320 executes a rider-down action. In some embodiments, the image processor 326 outputs a rider-down output, which is received by the controller 320. The controller 320 thus is configured to execute the rider-down action based upon the rider-down analysis.

One rider-down analysis (step S720 in FIG. 7) is illustrated using FIGS. 8A and 8B. The image processor 326, utilizing the object recognition process, analyzes the image to be analyzed for the presence of an object in the image to be analyzed indicative of the water-sports participant. If such an object is present in the image, the image processor determines that the water-sports participant has not fallen, or, in other words, is up. If such an object is not present in the image, the image processor determines that the water-sports participant has fallen, or, in other words, is down.

In some embodiments, the object indicative of the water-sports participant is the water-sports participant himself or herself. The image processor 326 may be configured to identify a person's body and/or portions thereof, and the object indicative of the water-sports participant is at least a portion of a person's body. In the captured image shown in FIG. 8A, the rider is identified by the image processor as indicated by reference numeral 12, and the image processor 326 determines that the water-sports participant is up. But, in the captured image shown in FIG. 8B, the rider 12 is not identified, and the image processor 326 determines that the water-sports participant is down.

Figure 8C:
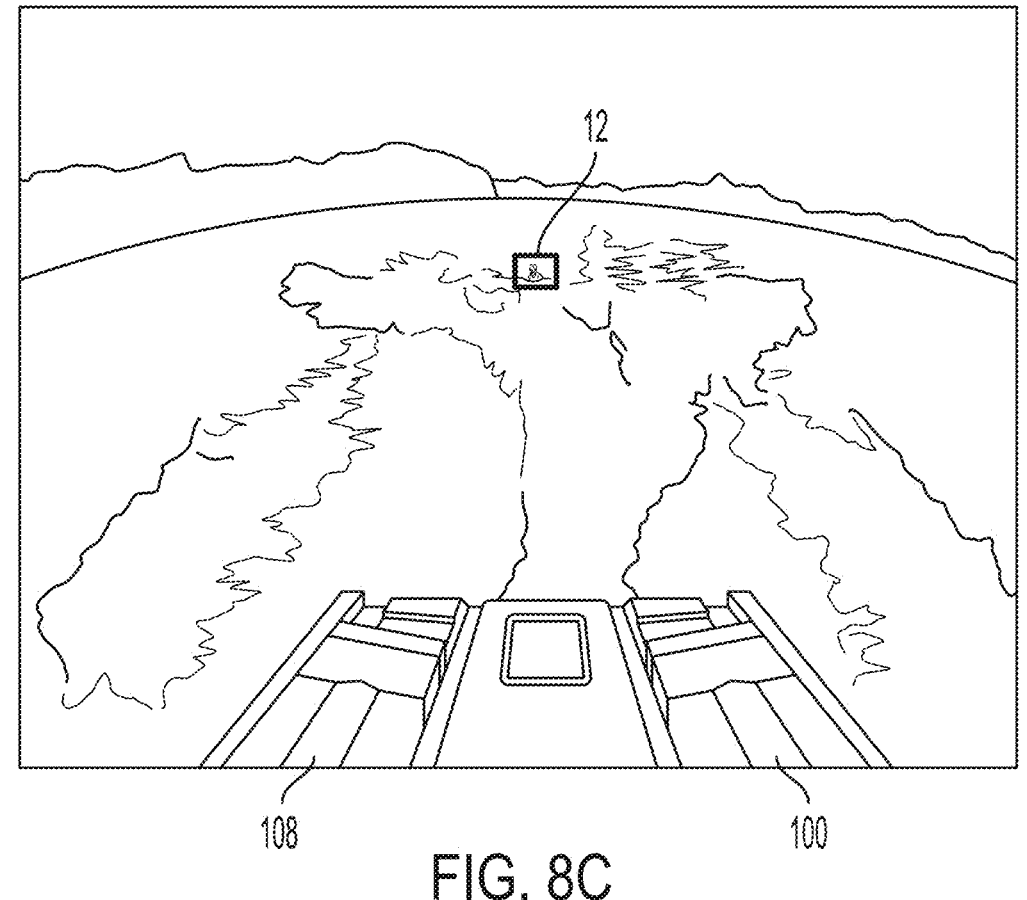

A facial recognition image analysis may be performed to identify and distinguish the face of a person from other objects in the image. In some embodiments, however, identifying the face (or head) of the water-sports participant may lead to errant determinations. FIG. 8C is another example of an image captured by the image sensor 310 and subjected to the rider-down analysis discussed above. If only the face were identified, the image processor 326 may identify the rider 12 in the image shown in FIG. 8C and thus determine that the water-sports participant is up. In this image, however, the rider has fallen and is floating with his head above the water. Accordingly, in other embodiments, an approach where a substantial portion of a person's body, such as, for example, at least the person's torso, if not also the legs, is used to identify the rider. In such an analysis, the object indicative of the water-sports participant is at least a portion of a person's body, and the portion of the person's body includes a portion of the person's body other than the head (e.g., the person's torso or legs). Using such a process on the image shown in FIG. 8C would result in the image processor 326 determining that the water-sports participant has fallen.

Figure 9:
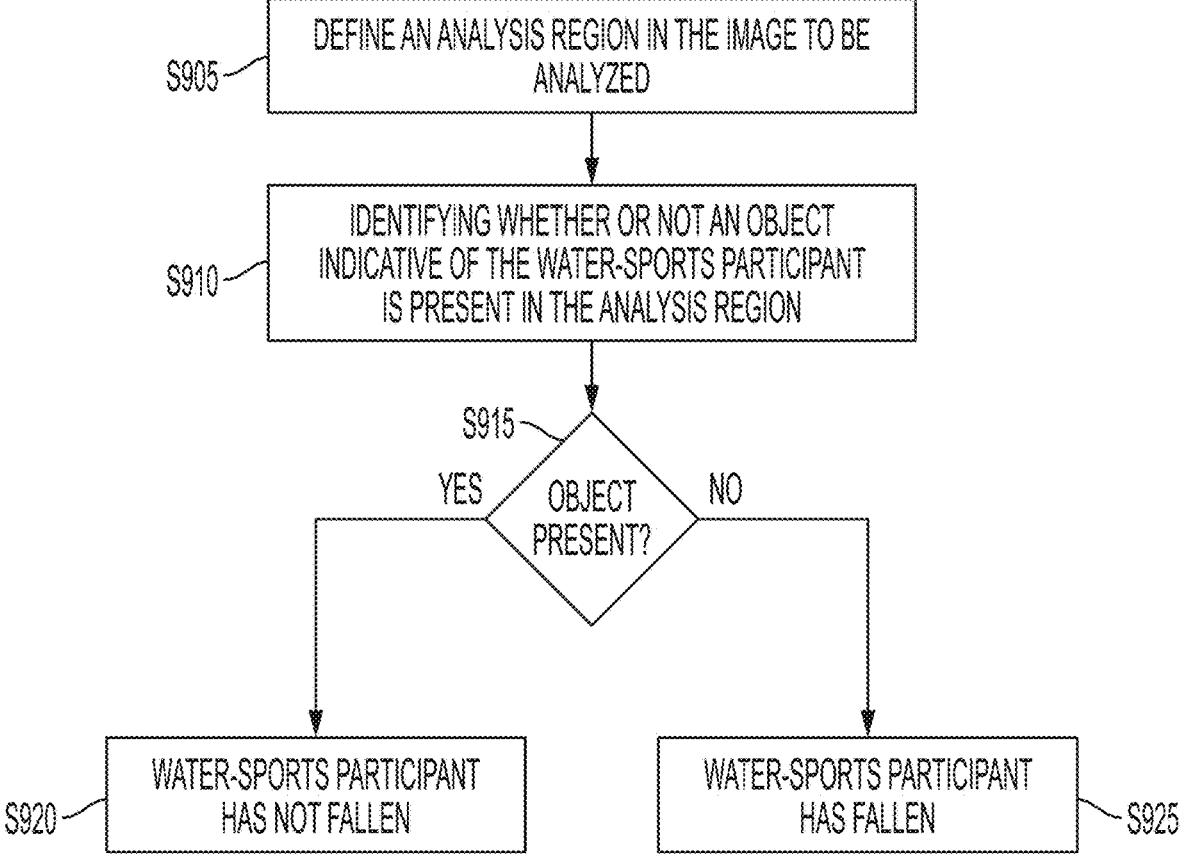
FIG. 9 is a flow chart of another rider-down analysis.

FIG. 9 is a flow chart of another rider-down analysis (step S720). This approach can be used to determine that the water-sports participant is down without the need to identify a substantial portion of the person's body. This approach is similar to the approach discussed above but utilizes an analysis region. In this rider-down analysis, the image processor 326 limits the portion of the captured image in which the object identification is performed. As noted above, the rider is expected to be located a certain distance behind the boat when the rider is up. The image analysis may be performed over a range of distances behind the boat that corresponds to the water sport, and not in other portions of the image. In step S905, the image processor 326 defines an analysis region in the image to be analyzed. The analysis region includes a portion of the water surface corresponding to a set distance range behind the boat. Ranges corresponding to the water sport, as discussed above, may be used to define the set distance range of the analysis region.

Figure 10A:
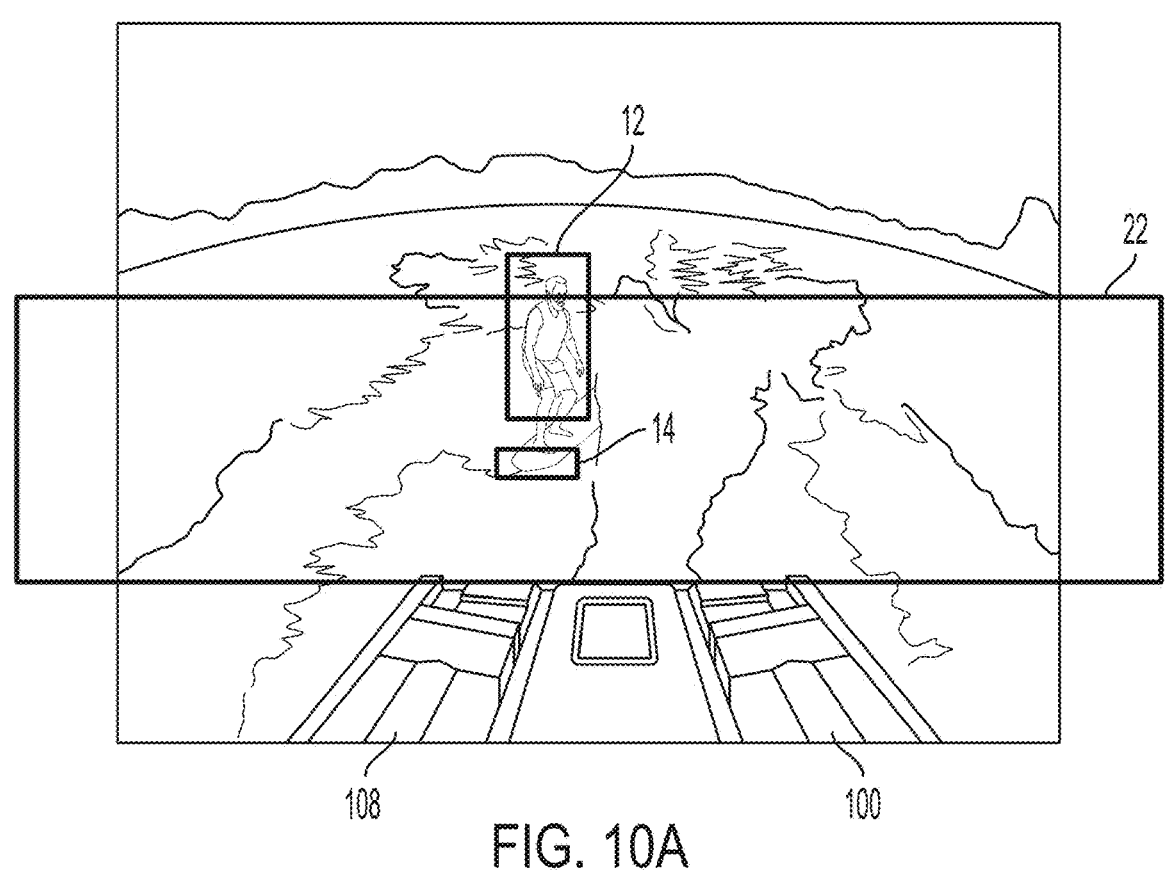
FIGS. 10A and 10B are images captured by the image sensor, as analyzed using a rider-down analysis shown in FIG. 9.
Figure 10B:
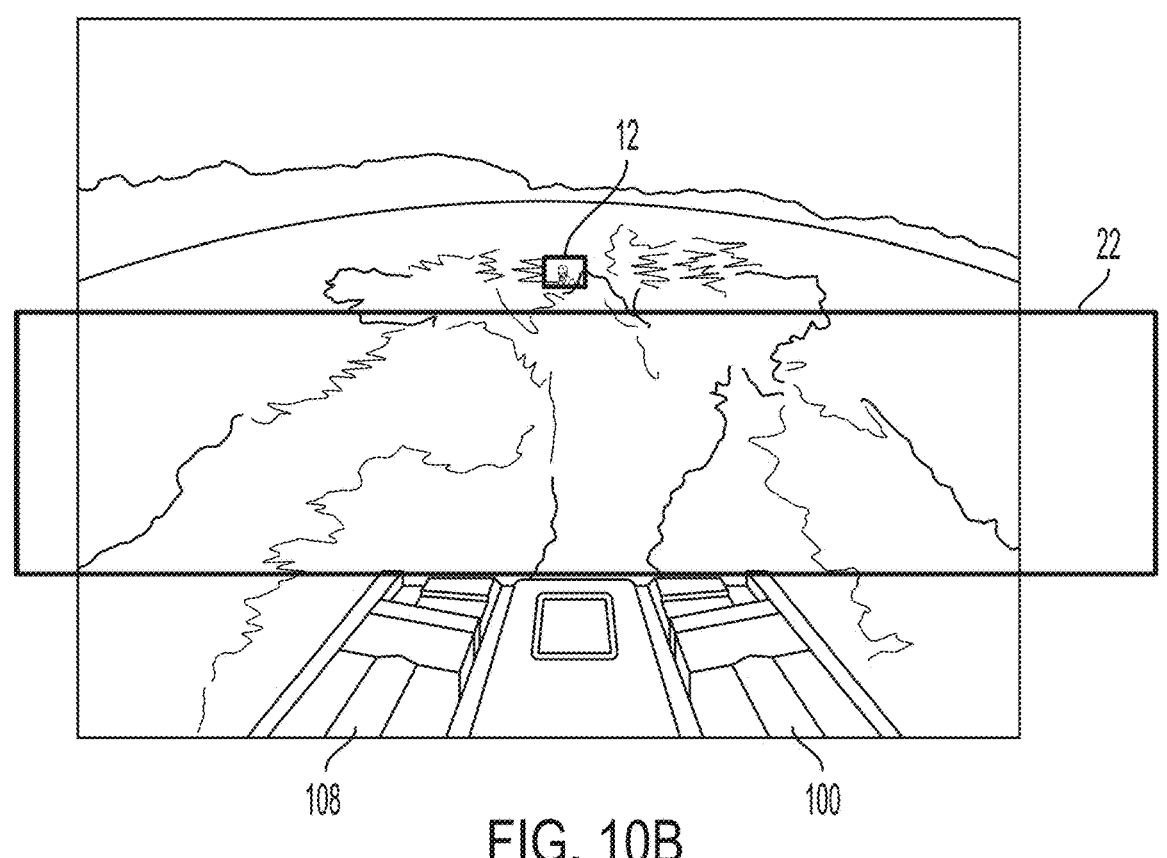

FIGS. 10A and 10B are examples of images captured by the image sensor 310 and show the environment aft of the stern 108 of the boat 100. The analysis regions are indicated by reference numeral 22, and, as can be seen in these figures, the analysis region is only a portion of the image to be analyzed.

In step S910 shown in FIG. 9, the image processor 326, utilizing the object recognition process, analyzes the analysis region 22 for the presence of an object indicative of the water-sports participant. Step S915 illustrates a decision point in the process. If an object indicative of the water-sports participant is present in the analysis region 22, the image processor 326 determines that the water-sports participant has not fallen, or, in other words, is up (step S920). If an object indicative of the water-sports participant is not present in the analysis region 22, the image processor 326 determines that the water-sports participant has fallen, or, in other words, is down (step S925). As discussed above, the object indicative of the water-sports participant may be the rider 12. In the image shown in FIG. 10A, the image processor 326 identifies that the rider 12 is in the analysis region 22 and thus determines that the water-sports participant has not fallen (step S920), but in the image shown in FIG. 10B, the image processor 326 identifies that the rider 12 is not in the analysis region 22 (in this case, identifies the rider 12 as being outside of the analysis region 22) and thus determines that the water-sports participant has fallen (step S925).

In the examples above, the object indicative of the water-sports participant is the rider 12, but in this analysis and in the other rider-down analyses discussed herein, the object indicative of the water-sports participant may be objects other than the rider. The rider typically is on a piece of water-sports equipment used for the water sport, such as a board, skis, or tube, for example. When water skiing, the rider is on water skis. When wakeboarding or wake surfing, the rider is on a board (e.g., wakeboard or surfboard). When tubing, the rider is on an inflatable tube. In some embodiments, the object indicative of the water-sports participant is a piece of water-sports equipment, and more specifically, a board (e.g., wakeboard or surfboard), ski, or tube. In FIG. 10A, for example, the surfboard is identified in the analysis region 22 by the image processor, as indicated by reference numeral 14, and the image processor 326 determines that the water-sports participant is up. But, in the captured image shown in FIG. 10B, the board 14 is not identified in the analysis region 22, and the image processor 326 determines that the water-sports participant is down.

The analysis region 22 may be set based on the water sport. As discussed above, the side display 184 includes a plurality of user-selectable elements, each corresponding to a different water sport (e.g., the surf button 195, the wake button 197, and the ski button 199). When one of these user-selectable elements is selected, the controller 320 sets the set distance range of the analysis region based on the selected water sport. The analysis region 22 may be defined by a minimum distance behind the aft most portion of the boat to a maximum distance behind the aft most portion of the boat. The analysis region 22 may also be defined to have a width, such as a distance on either side of the centerline 102. As noted above, for a water sport, such as wake surfing (a first water sport), that is performed closer to the boat, each of the minimum distance and the maximum distance may be less than the corresponding minimum distance and maximum distance for a second water sport, such as wakeboarding. Likewise, the width (distance from the centerline) of the analysis region 22 for wake surfing may be less than the width for wakeboarding.

In this rider-down analysis shown and described with respect to FIGS. 9 to 10B, the analysis region 22 is used to limit the area in which the object region process is used, thereby limiting false positives. Another approach to minimize false positives is to limit the field of view for the image sensor 310 based on the water sport, as discussed above, and thus the captured image is limited to the area in which the rider is expected to be located when engaged in the water sport.

Figure 11:
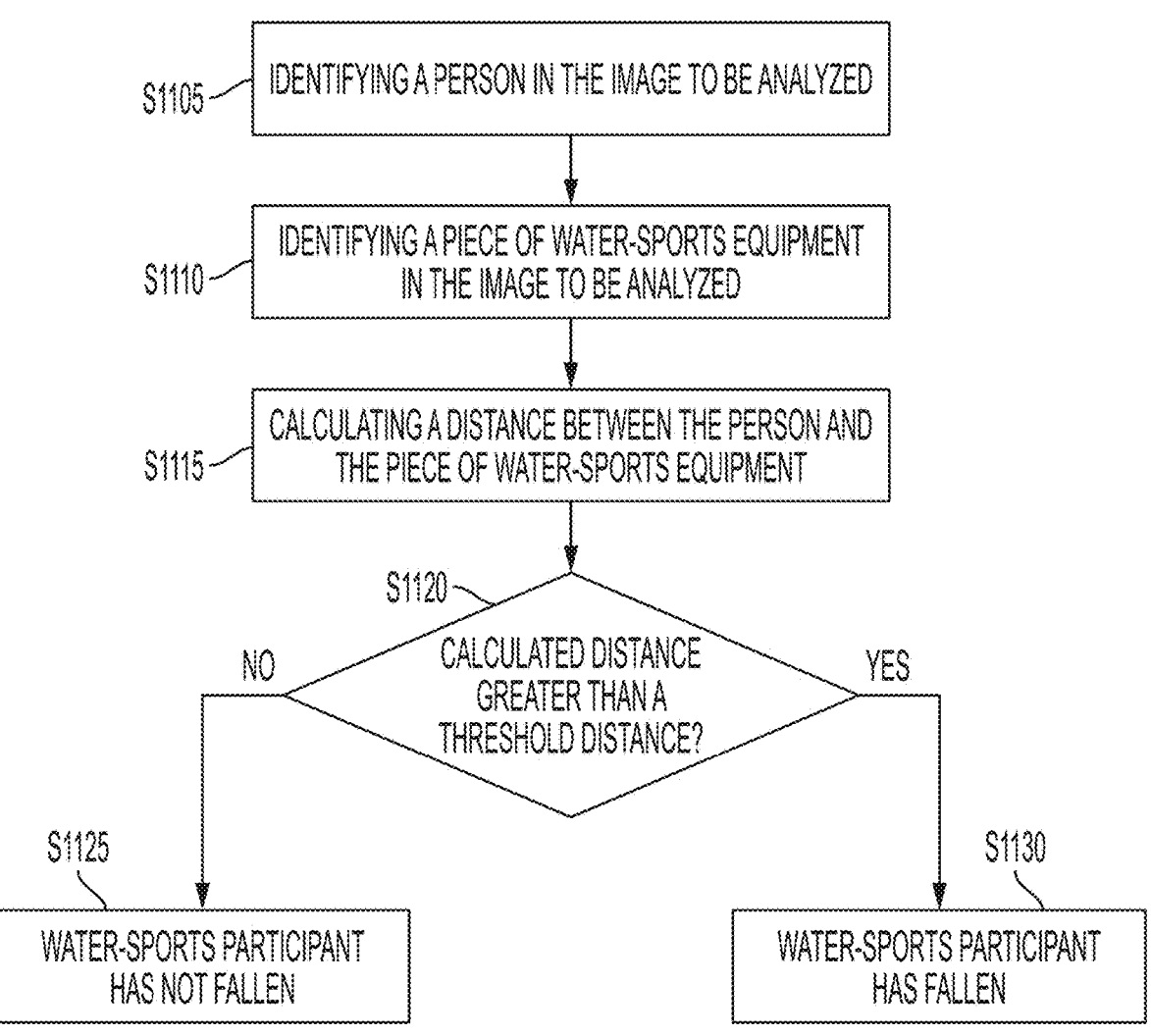
FIG. 11 is a flow chart of another rider-down analysis.

FIG. 11 is a flow chart of another rider-down analysis (step S720). In this embodiment, the image processor 326 analyzes the image to be analyzed for both the water-sports participant (rider 12) and the piece of water-sports equipment, the proximity of the piece of water-sports equipment to a person identified in the image is used to determine if the rider is up or if the rider is down (fallen). In step S1105, the image processor 326 analyzes the image to be analyzed to identify a person (rider 12 in FIGS. 12A and 12B) in the image to be analyzed. In step S1110, the image processor 326 analyzes the image to be analyzed to identify a piece of water-sports equipment, such as a tube 16 in FIGS. 12A and 12B, in the image to be analyzed. In step S1115, the image processor 326 then calculates a distance d (see FIG. 12B) between the person (rider 12) and the piece of water-sports equipment (tube 16)

Figure 12A:
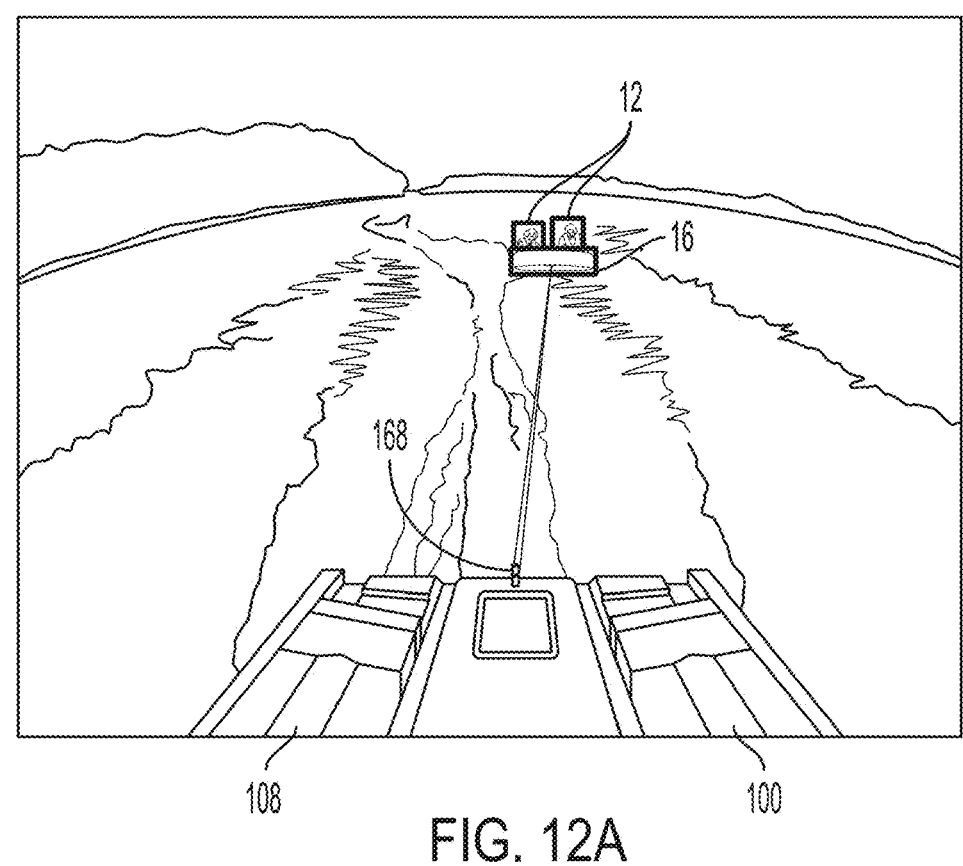
FIGS. 12A and 12B are images captured by the image sensor, as analyzed using a rider-down analysis shown in FIG. 11.
Figure 12B:
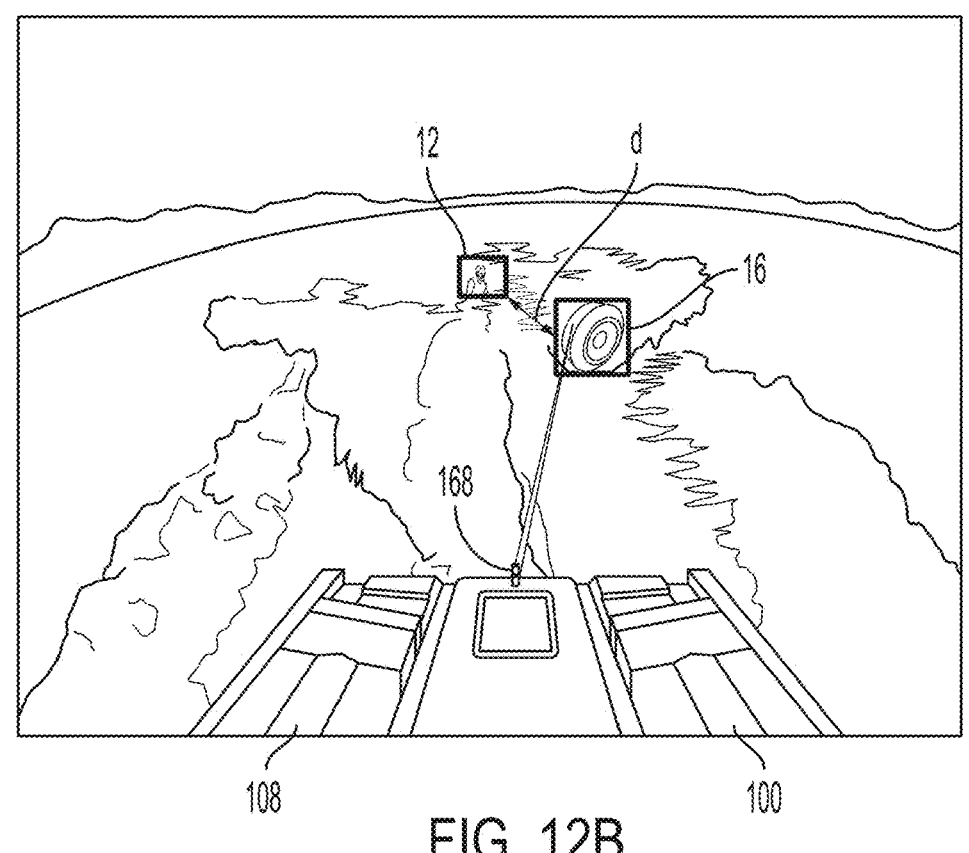

FIGS. 12A and 12B are examples of images captured by the image sensor 310 and show the environment aft of the stern 108 of the boat 100 as analyzed by the image processor 326. FIG. 12A shows two riders 12 located on a tube 16, and FIG. 12B shows a rider 12 off of the tube 16. Step S1120 in FIG. 11 illustrates a decision point in the process, and the image processor 326 determines if the calculated distance d between the person (rider 12) and the piece of water-sports equipment (tube 16) is greater than a threshold distance. If the calculated distance d is within a threshold distance (not greater than the threshold distance), the image processor 326 determines that the water-sports participant has not fallen (step S1125), as shown in FIG. 12A. In FIG. 12A the distance d is zero or overlapping in this example and thus less than the threshold distance. If the calculated distance d is greater than the threshold distance, the image processor 326 determines that the water-sports participant has fallen (step S1130), as shown in FIG. 12B. In a case where only the piece of water-sports equipment is identified (tube 16), the image processor 326 may also determine that the water-sports participant has fallen. For example, the distance d may be infinite and thus greater than the threshold distance. This analysis method may be particularly useful where the piece of water-sports equipment is attached to the boat 100, such as a tube 16.

Figure 13:
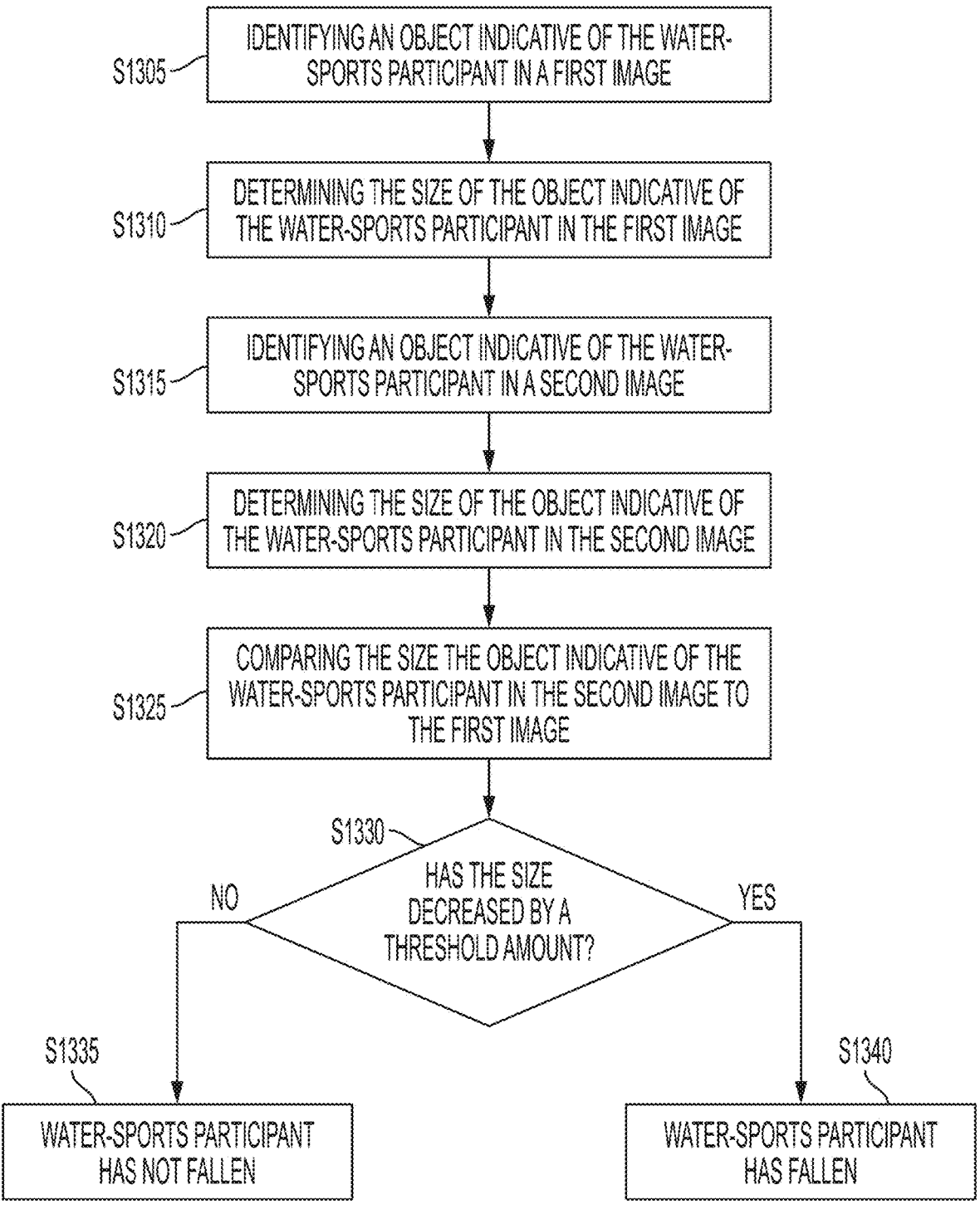
FIG. 13 is a flow chart of another rider-down analysis.
Figure 14A:
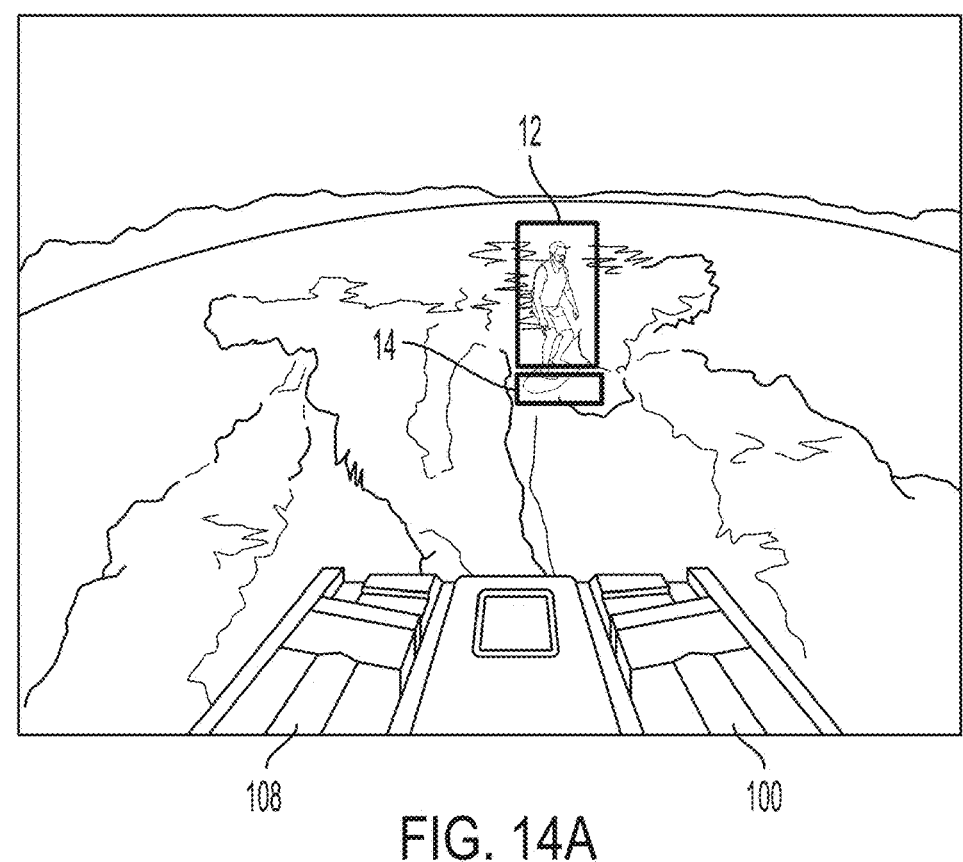
FIGS. 14A, 14B, and 14C are images captured by the image sensor, as analyzed using a rider-down analysis shown in FIG. 13.
Figure 14B:
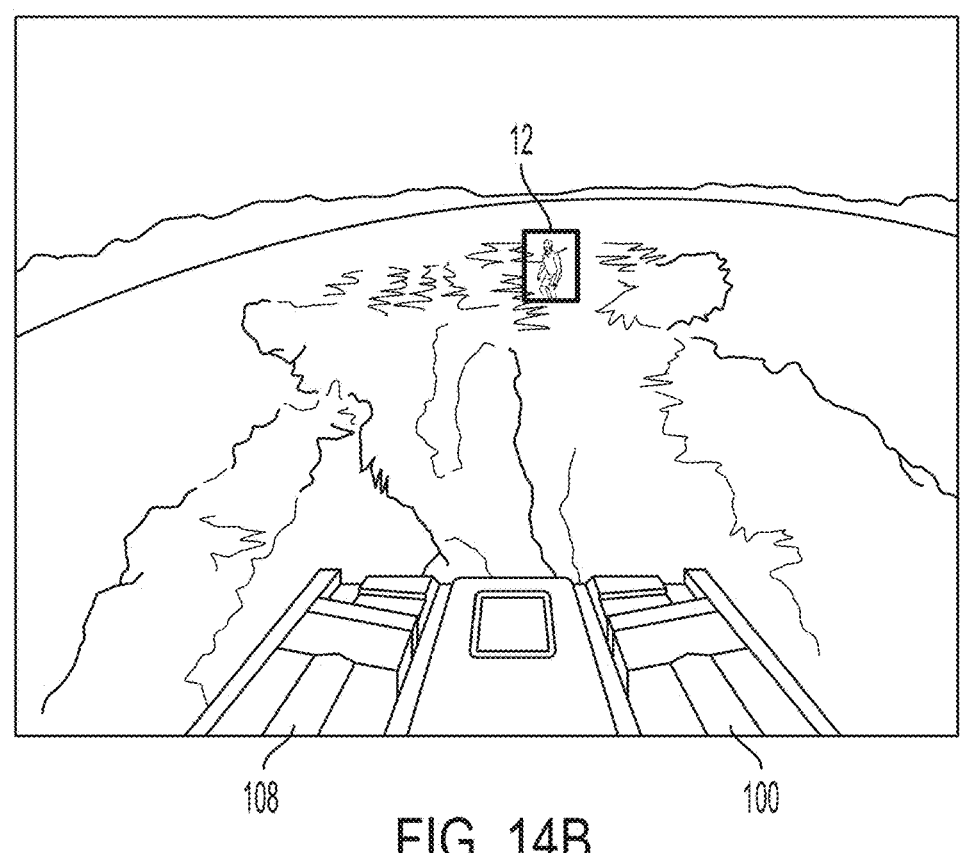
Figure 14C:
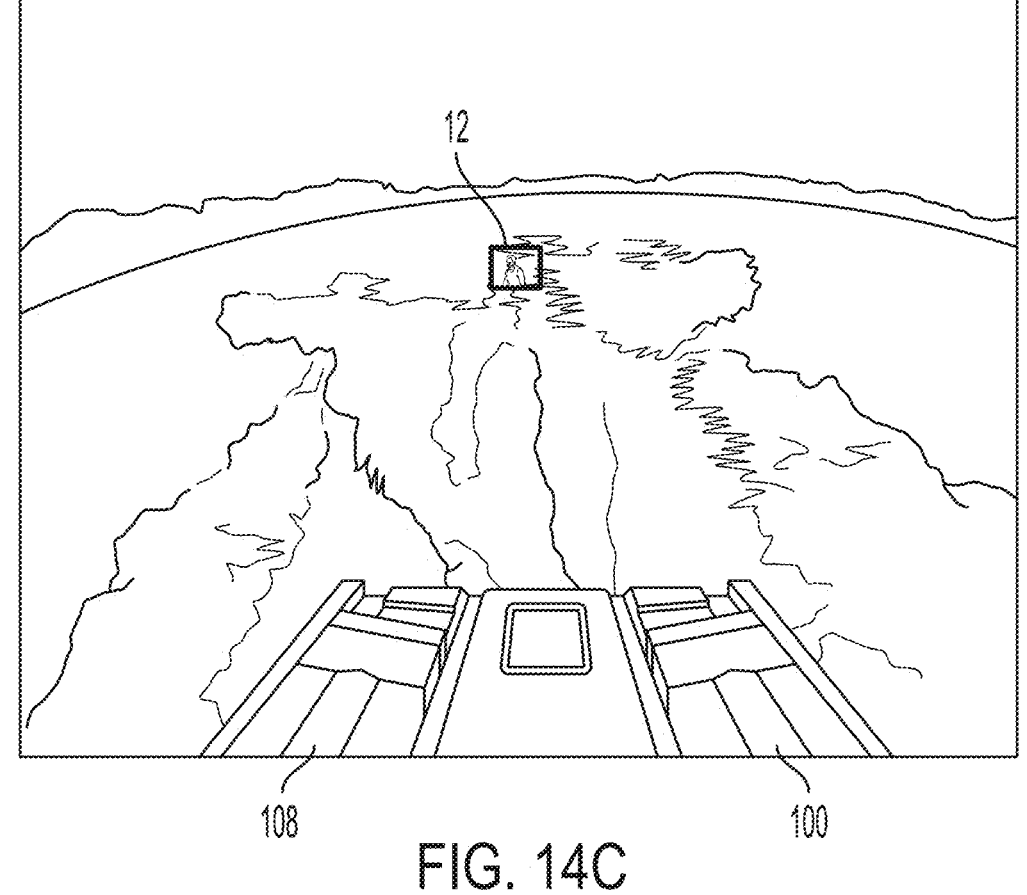

FIG. 13 is a flow chart of another rider-down analysis (step S720), and FIGS. 14A to 14C are examples of images captured by the image sensor 310 and show the environment aft of the stern 108 of the boat 100 as analyzed by the image processor 326 using the process shown in FIG. 13. The image sensor 310 may be configured to capture a plurality of images in a sequence. The image processor 326 may be configured to perform object identification on the sequence of captured images and make comparisons between images in the sequence. Each of the captured images may be the images to be analyzed to determine if the water-sports participant has fallen. When the rider 12 has fallen, the boat 100 will move away from the rider 12, and the rider 12 (or other object indicative of the water-sports participant) will get progressively smaller in the series of captured images. The image analysis performed by the image processor 326 may include a determination of the size of the identified object, such as the size of the rider 12. In step S1305, the image processor 326 identifies the object indicative of the water-sports participant, such as the rider 12, in a first (or reference) image, as in FIG. 14A, for example. In step S1310, the image processor 326 calculates the size of the rider 12 in the first image. The image processor 326 then analyzes a second image subsequent to the first image. In step S1315, the image processor 326 identifies the rider 12 in the second image, as in FIG. 14B or FIG. 14C, for example. The image processor 326 calculates the size of the rider 12 in the second image in step S1320, and then compares the size of the rider 12 in the second image to the size of the rider 12 in the first image in step S1325. Step S1330 is a decision point in the process. If the size of the rider 12 in the second image has not decreased more than a threshold amount, the image processor 326 determines that the rider 12 has not fallen (step S1335), as in FIG. 14B, for example, but if the size of the rider 12 in the second image has decreased more than the threshold amount, the image processor 326 determines that the rider 12 has fallen (step S1340), as in FIG. 14C, for example. In this embodiment, a size decrease relative to a first (or reference) image is used to account for various shapes and sizes of riders, but other approaches may be used, including, for example, determining the size of the rider 12 (or other object indicative of the water-sports participant) and comparing it to a reference size stored in the memory 324, for example.

In the method discussed with reference to FIG. 13, the distance that the rider 12 (or other object indicative of the water-sports participant) is behind the boat 100 is used to determine if the water-sports participant has fallen. The distance of the rider 12 behind the boat 100 is calculated from the captured image, but other methods may be used to determine if the rider has exceeded a predetermined distance behind the boat.

Figure 15:
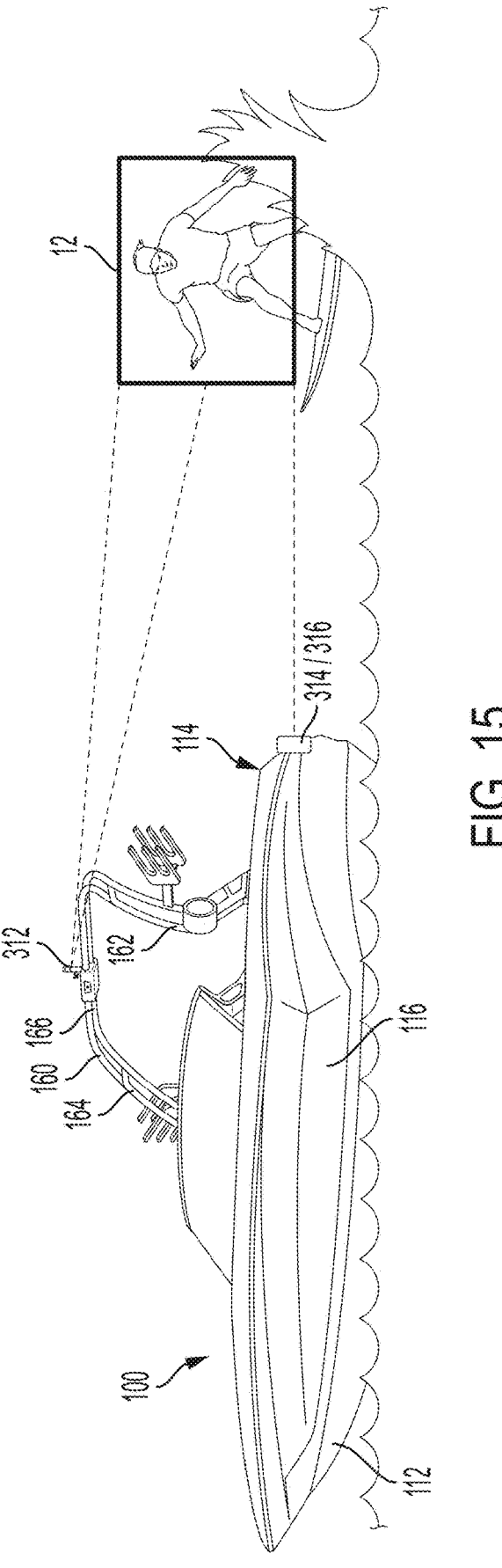
FIG. 15 is a schematic of the boat shown in FIG. 1 equipped with multiple image sensors.

FIG. 15 is a schematic of the boat 100 with a surfer (water-sports participant) behind the boat 100. As noted above, a plurality of image sensors 310 may be used, and in this embodiment, the image sensors 310 are image sensors of different types. One image sensor 310 is a visual image sensor (camera 312) that is mounted on the tower 160 in the manner discussed above, for example, and another is a radar sensor 314 or a LiDAR sensor 316 positioned on the transom 114 in one of the positions discussed above. The radar sensor 314 or LiDAR sensor 316 can be used to determine the distance the water-sport participant (rider 12) is from the boat 100, and when the distance exceeds a certain amount (threshold or predetermined amount) or is not detected, the image processor 326 determines that the rider has fallen. Image processing of a visual image captured by the camera 312 may also be used to help eliminate false determinations of a rider being down or up, as the object recognition using the image processor 326 can be used to identify which objects should be tracked and which distances should be used for the appropriate rider down determination.

Figure 16:
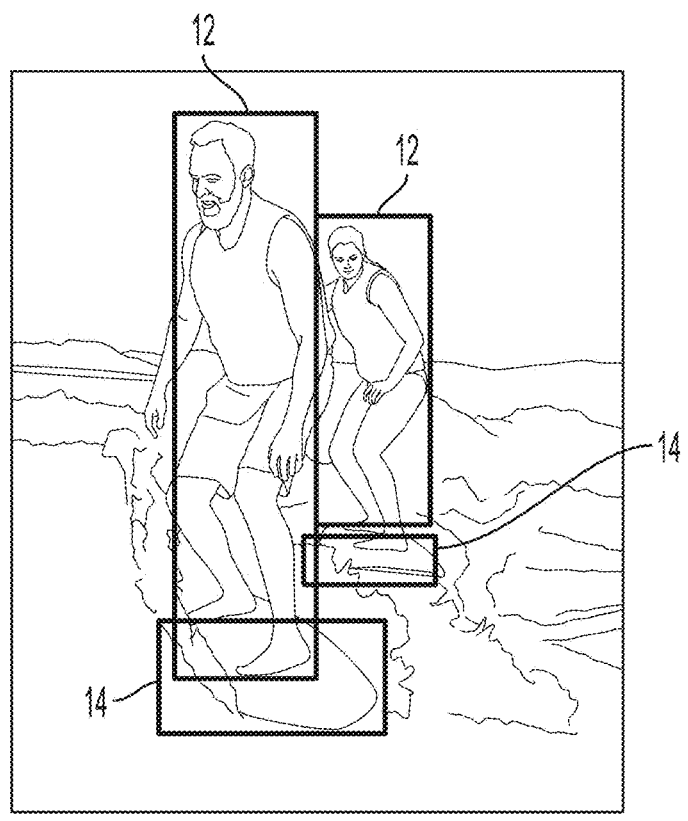
FIG. 16 is an image captured by an image sensor located on the port side of the boat with multiple water-sports participants identified in the captured image using one of the analysis methods discussed herein.

The embodiments discussed above have been described with a single water-sports participant being detected and the notification (or other action) made when he or she falls. However, the embodiments and approaches discussed herein may be used for water sports and riders involving multiple water-sports participants. FIG. 16, for example, is an image captured by an image sensor 310 located on the port side of the boat 100 (such as image sensor 310c, image sensor 310e, or image sensor 310g in FIG. 6). In the image there are two riders 12 and surfboards 14, and the image processor 326 is configured to detect both riders 12 and/or surfboards 14 and determine if one or both of the riders 12 have fallen. The rider-down output discussed above may be generated when the image processor 326 determines that one of the two riders 12 is down. In other embodiments, the image processor may generate the output when it determines that both of the riders 12 are down. In this example, both of the riders 12 are wake surfers, surfing in a tandem arrangement, but the systems and methods discussed herein may be configured to detect riders engaged in different water sports simultaneously, such as a wake surfer and a foiler farther behind the wake surfer on the wake. The multiple detected water-sports participants may be detected even when they are not in a tandem arrangement, such as, for example, one surfer on the port side of the boat, and the other on the starboard side of the boat 100. In addition, the multiple water-sports participants can be more than two.

As discussed above with reference to FIG. 7, the controller 320 is configured to execute a rider-down action (step S730) once the image processor 326 determines that the rider has fallen (step S720) and/or the controller 320 receives the rider-down output. Various suitable rider-down actions may be taken by the controller 320.

In one embodiment, the rider-down action is an alert. As shown in FIG. 5, the controller 320 is communicatively coupled to at least one indicator 340. When the image processor 326 determines that the rider has fallen, the controller 320 transmits an output to the indicator 340 to alert the driver or others that the rider has fallen. This output is referred to herein as an indicator output. Any suitable indicator 340 may be used to issue the alert. For example, the indicator may be one of the displays on the control console 180, such as the center display 182. Upon receipt of the indicator output from the controller 320, the center display 182 displays the alert to indicate that the rider has fallen. The alert may take any suitable form, including, for example, a symbol, text, and/or coloring of the display. A light 342 is another suitable indicator 340. When the image processor 326 determines that the rider has fallen, the controller 320 transmits an output to turn the light 342 on. Alternatively, the light 342 may be configured to flash to provide the alert that the rider has fallen. The light 342 may be located on the control console 180, for example. A speaker 344 is another suitable indicator 340. The controller 320 may be configured to transmit an output that causes the speaker 344 to issue an audible alert. The speaker 344 is schematically shown in FIG. 5 as being separate from the audio system 330, but one or more of the speakers 170 of the audio system 330 may be used as the indicator 340. The audible alert may be an alarm indicating that the rider has fallen, speech stating that the rider has fallen, or both.

Figure 17:
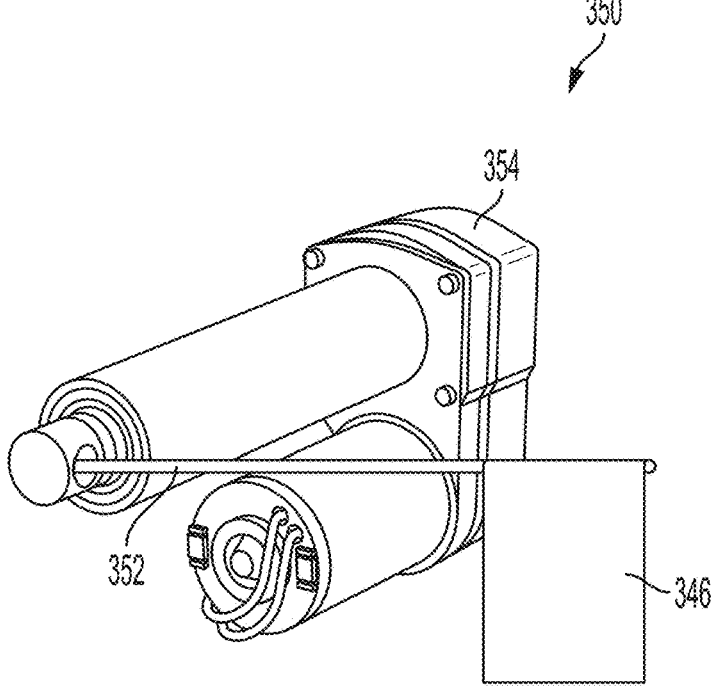
FIG. 17 is an automatic skier-down flag assembly with a skier-down flag in a non-deployed position.
Figures 18, 19:
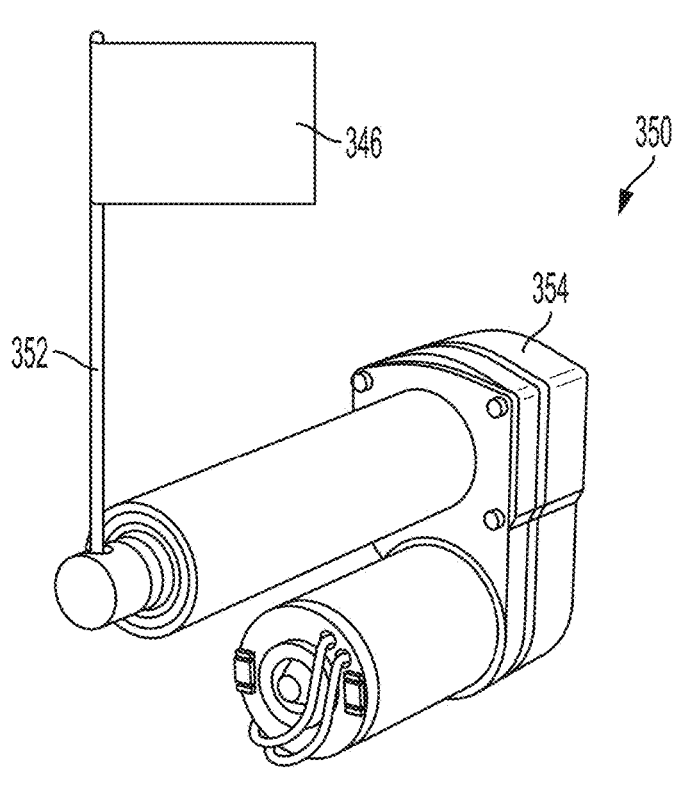
FIG. 18 is the automatic skier-down flag assembly shown in FIG. 17 with the skier-down flag in a deployed position.
FIG. 19 shows a boat with possible mounting positions for the automatic skier-down flag assembly.

The indicator 340 may be a suitable indication that alerts other boaters that the rider has fallen. For example, the indicator may be a flag 346, such as a so-called "skier-down flag." FIGS. 17 and 18 show an example of an automatic skier-down flag assembly 350. The skier-down flag 346 is a bright red or brilliant orange flag that is at least 12 by 12 inches in size and mounted on a pole 352 at least 24 inches long. Some states require that a flag be flown when the rider has fallen or is preparing to get up. FIG. 19 shows the boat 100 with the automatic skier-down flag assembly 350 attached thereto. The skier-down flag 346 may be attached to the boat 100 at any suitable location visible to observers outside of the boat 100 including, for example, on the tower 160, such as on one of the port leg 162 or the starboard leg 164, or on the windshield 104.

When the image processor 326 determines that the rider has fallen, the controller 320 transmits an output to deploy the skier-down flag 346. Various suitable mechanisms may be used to deploy the skier-down flag 346. The flag, more specifically the pole 352, may be movably attached to the boat 100 and can move between a non-deployed position (FIG. 17) and a deployed position (FIG. 18) by rotating (e.g., pivoting about a pivot point). In this embodiment, the skier-down flag 346 is moved by an actuator 354 to rotate the skier-down flag 346 and, more specifically, the pole 352 about the pivot point. The controller 320 is configured to operate the actuator 354 to move the skier-down flag 346 between the non-deployed position and the deployed position. The controller 320 may be configured to move the light 342 to the deployed position when the image processor 326 determines the rider is down. The skier-down flag 346 may be moved in other ways, such as by translation (e.g., being raised linearly or telescopically).

Other suitable mechanisms may be used to deploy the skier-down flag 346. For example, a biasing member, such as a spring, may be used to provide the motive force to move the skier-down flag 346 from the non-deployed position to the deployed position. The skier-down flag 346 may be held in the non-deployed position by a latch. In this example, the indicator output from the controller 320 to deploy the flag may release the latch such as by operating a solenoid.

As shown in FIG. 5, the controller 320 is also communicatively coupled to other systems on the boat 100, such as the propulsion system 200, for example. When the image processor 326 determines that the rider has fallen (e.g., the controller 320 receives the rider-down output), rider-down output may be used to trigger other actions on the boat 100. For example, upon determination by the image processor 326 that the rider is down, the controller 320 may reduce the speed of the boat 100. The controller 320 is communicatively coupled to the propulsion system 200, and upon determination by the image processor 326 that the rider is down, the controller 320 may operate the propulsion system 200, such as by operating the throttle 214, to reduce the speed (revolutions per minute, "rpms") of the engine 210. The controller 320 may move the throttle 214 to an idle position (rpm speed). In another approach, the controller 320 may change the set speed of the cruise control. In a further approach, the controller 320 may place the drive train in neutral.

The controller 320 is also communicatively coupled to the audio system 330 for the boat 100. Upon determination by the image processor 326 that the rider is down, the controller 320 may adjust the audio system 330. For example, the controller 320 may reduce the volume output by the speakers 170 of the audio system 330 or even mute the speakers 170. Further, the controller 320 may be configured to control the audio source 334 upon determination by the image processor 326 that the rider is down. When the audio source 334 has the ability to pause (e.g., a playback device or device streaming audio), the controller 320 may be configured to pause playing the audio from the audio source 334 upon determination by the image processor 326 that the rider is down.

In the discussion above, the actions by the controller 320 to operate the audio system 330 when the rider is down occur automatically when the image processor 326 determines that the rider is down. The controller 320 also may be responsive to other inputs from the operator that are indicative of a rider being down and adjust the audio system 330, as discussed above, in response to those other inputs. For example, the operator may "chop" the throttle (control lever 212) when he or she determines that the rider is down or receives the alert from the indicator 340 that the rider is down. The controller 320 may be configured to monitor the propulsion system 200, and, more specifically, in this embodiment, the engine 210, the throttle 214, and/or the control lever 212.

When the operator moves the control lever 212 to reduce the speed of the engine 210, the controller 320 may detect such a deceleration as an indication that the rider is down. The controller 320 may detect that the rpms of the engine 210 have decreased from operating speeds for the water sport (e.g., 3000 rpms to 3500 rpms) to a speed closer to idle (e.g., 1000 rpms) or even idle (e.g., 700 rpms). In some embodiments, the indication that the rider has fallen is a decrease in engine rpms over a predetermined period of time. The reduction in rpms may be at least 500 rpms, more preferably at least 1000 rpms, even more preferably 1500 rpms, and still more preferably 2000 rpms. The period of time for this reduction may be, for example, one second or less. In other embodiments, the indication that the rider has fallen is a decrease in the speed of the boat 100 over a predetermined period of time. For surfing and similar water sports, the reduction in speed may be from surf speeds, such as 10 mph to 12 mph, to speeds of about 4 mph to 8 mph for a reduction of from 2 mph to 8 mph. For other water sports that occur when the boat 100 is on plane, such as wakeboarding, the reduction may be to speed below planing, such as preferably less than 15 mph and more preferably less than 10 mph. In wakeboarding, for example, such a speed differential would be from wakeboarding speed of 17 mph to 23 mph. The period of time for the speed reduction may be, for example, several seconds, such as between 2 seconds and 10 seconds. In some embodiments, where the boat is planing for example, the indication that the rider has fallen may simply be a reduction in speed, such as when the boat reduces speed below a threshold speed without considering the period of time over which the speed reduction occurs. In other embodiments, the indication that the rider has fallen may be from a sensor indicating the control lever 212 has been placed in neutral.

In some embodiments, this control of the audio system 330 based on deacceleration may only be active in a particular mode, such as one of the tow modes. Accordingly, the controller 320 may activate (or deactivate) the audio control when the rider falls, based on a user selecting a user-selectable element (e.g., the surf button 195).

The rider-down analyses (step S720) discussed above have generally been designed to implement steps in the analysis to minimize the likelihood of false positives. A false positive includes, for example, identifying a person in the image, but the identified person is not the rider. In such a case, the image processor will not indicate the rider has fallen, when in fact, the rider may have fallen. Another example of a false positive may occur when the rider is just getting up (starting). In many cases, the rider will start in the water, and in such cases some of the analysis methods discussed above would determine that the rider is down and provide an alert or other action. When getting started, however, the alerts that the rider is down (or other actions taken when the rider is down) may not be desired. As noted above with reference to the process discussed in FIG. 7, the controller 320 activates the process in step S705. The side display 184 may include a button (rider down alert button 304 shown in FIG. 5) used to activate or deactivate the rider-down analysis. Additionally or alternatively, the rider-down analysis may be performed only when operating in a particular mode, such as a tow mode, and thus the controller 320 activates the rider-down analysis when one of the surf button 195, the wake button 197, or the ski button 199 is selected, and deactivates the rider-down analysis when the chill button 193 is selected or the boat 100 is operating in the drive mode (e.g., the drive button 191 is selected).

In other embodiments, the controller 320 activates the rider-down analysis based on the operation of the boat 100. Typically, the boat 100 is stopped or moving slowly as the rider is in the water getting ready. Once ready, the driver begins to accelerate the boat 100. As noted above, the controller 320 is communicatively coupled to the propulsion system 200 and/or other sensors (such as GPS receivers) to monitor the operation of the propulsion system 200, such as the speed of the engine 210 or the speed of the boat 100. The rider-down analysis may be activated based on this acceleration. For example, the controller 320 may activate (enable) the rider-down analysis after a predetermined amount of time (e.g., 5 seconds) has elapsed from when the boat 100 begins to accelerate. In another example, the controller 320 activates the rider-down analysis after the boat reaches a threshold speed or sustains operation above the threshold speed for the predetermined amount of time.

In the examples discussed above, the controller 320 activates the rider-down analysis, but instead of (or in addition to) activating or deactivating the rider-down analysis, the controller 320 may activate the rider-down actions. For example, the rider-down analysis may proceed in the background, but the controller 320 activates or deactivates the alerts based on the conditions discussed above.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A boat comprising:
a stern;
an image sensor positioned on the boat to have a field of view of an environment aft of the stern of the boat, the image sensor configured to capture at least one image of the environment aft of the stern of the boat, the environment captured in the at least one image including a water surface aft of the boat; and
an image processor communicatively coupled to the image sensor, the image processor configured to:
receive the at least one image from the image sensor;
identify, using an object recognition process executed by the image processor, whether or not an object indicative of a water-sports participant is present in an image to be analyzed, the image to be analyzed including the at least one image captured by the image sensor; and
determine that the water-sports participant has fallen when the object indicative of the water-sports participant is not present in the image to be analyzed.

2. The boat of claim 1, wherein the object indicative of the water-sports participant is a piece of water-sports equipment.

3. The boat of claim 1, wherein the object indicative of the water-sports participant is at least a portion of a body of a person.

4. The boat of claim 3, wherein the portion of the body includes at least one of a torso or legs of the person.

5. The boat of claim 1, further comprising a controller communicatively coupled to the image processor and configured to execute a rider-down action when the image processor determines that the water-sports participant has fallen.

6. The boat of claim 5, further comprising an indicator communicatively coupled to the controller, the indicator configured to receive an indicator output from the controller and provide an alert indicating that the water-sports participant has fallen, the indicator output being the rider-down action.

7. The boat of claim 5, further comprising an audio system including at least one speaker and an audio source, wherein the rider-down action includes reducing the volume of the audio system.

8. The boat of claim 5, further comprising a propulsion system including a propulsion motor, a propulsor, and a coupling between the propulsion motor and the propulsor, wherein the rider-down action includes at least one of reducing the speed of the propulsion system or placing the coupling between the propulsion motor and the propulsor in neutral.

9. A boat comprising:
a stern;
an image sensor positioned on the boat to have a field of view of an environment aft of the stern of the boat, the image sensor configured to capture at least one image of the environment aft of the stern of the boat, the environment captured in the at least one image including a water surface aft of the boat; and an image processor communicatively coupled to the image sensor, the image processor configured to:

receive the at least one image from the image sensor;

define an analysis region in an image to be analyzed, the image to be analyzed including the at least one image captured by the image sensor, the analysis region being only a portion of the image to be analyzed;

identify, using an object recognition process executed by the image processor, whether or not an object indicative of a water-sports participant is present in the analysis region; and determine that the water-sports participant has fallen when the object indicative of the water-sports participant is not present in the analysis region.

10. The boat of claim 9, wherein the object indicative of the water-sports participant is a piece of water-sports equipment.

11. The boat of claim 9, wherein the object indicative of the water-sports participant is at least a portion of a body of a person.

12. The boat of claim 11, wherein the portion of the body includes at least one of a torso or legs of the person.

13. The boat of claim 9, wherein the analysis region includes a portion of the water surface corresponding to a set distance range behind the boat.

14. The boat of claim 13, further comprising:

a user input device including a plurality of user-selectable elements each corresponding to a different water sport; and a controller communicatively coupled to the user input device; the controller being configured to receive an input from the user input device corresponding to a selected water sport and set the set distance range of the analysis region based on the selected water sport.

15. The boat of claim 14, wherein one of the plurality of user-selectable elements corresponds to a first water sport and another one of the plurality of user-selectable elements corresponds to a second water sport, wherein the controller sets the set distance range to be a range from a minimum distance to maximum distance in response to the input from user input device corresponding to the selected water sport, the maximum distance for the first water sport being a distance that is less than the maximum distance for the second water sport.

16. The boat of claim 9, further comprising a controller communicatively coupled to the image processor and configured to execute a rider-down action when the image processor determines that the water-sports participant has fallen.

17. The boat of claim 16, further comprising an indicator communicatively coupled to the controller, the indicator configured to receive an indicator output from the controller and provide an alert indicating that the water-sports participant has fallen, the indicator output being the rider-down action.

18. The boat of claim 16, further comprising an audio system including at least one speaker and an audio source, wherein the rider-down action includes reducing the volume of the audio system.

19. The boat of claim 16, further comprising a propulsion system including a propulsion motor, a propulsor, and a coupling between the propulsion motor and the propulsor, wherein the rider-down action includes at least one of reducing the speed of the propulsion system or placing the coupling between the propulsion motor and the propulsor in neutral.

20. A boat comprising:

a stern;

an image sensor positioned on the boat to have a field of view of an environment aft of the stern of the boat, the image sensor configured to capture at least one image of the environment aft of the stern of the boat, the environment captured in the at least one image including a water surface aft of the boat; and an image processor communicatively coupled to the image sensor, the image processor configured to:

receive the at least one image from the image sensor;

identify, using an object recognition process executed by the image processor, a person in an image to be analyzed, the image to be analyzed including the at least one image captured by the image sensor;

identify, using the object recognition process executed by the image processor, a piece of water-sports equipment in the image to be analyzed;

calculate a distance between the person and the piece of water-sports equipment in the image to be analyzed; and determine that a water-sports participant has fallen when the calculated distance between the person and the piece of water-sports equipment is greater than a threshold distance.

*   *   *   *   *